US010410165B2

(12) United States Patent
Tibbs et al.

(10) Patent No.: US 10,410,165 B2
(45) Date of Patent: *Sep. 10, 2019

(54) SYSTEMS AND METHODS FOR FACILITATING SHIPPING OF PARCELS FOR RETURNING ITEMS

(71) Applicant: United Parcel Service of America, Inc., Atlanta, GA (US)

(72) Inventors: Andy Tibbs, Roswell, GA (US); John Slayton, Brookhaven, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 925 days.

This patent is subject to a terminal disclaimer.

(21) Appl. No.: 14/942,697

(22) Filed: Nov. 16, 2015

(65) Prior Publication Data

US 2016/0140487 A1 May 19, 2016

Related U.S. Application Data

(60) Provisional application No. 62/080,130, filed on Nov. 14, 2014.

(51) Int. Cl.
*G06Q 10/08* (2012.01)
(52) U.S. Cl.
CPC ....... *G06Q 10/083* (2013.01); *G06Q 10/0837* (2013.01); *G06Q 10/08355* (2013.01)
(58) Field of Classification Search
CPC .......... G06Q 10/083; G06Q 10/08355; G06Q 10/0837
See application file for complete search history.

(56) References Cited

U.S. PATENT DOCUMENTS 3,712,468 A 1/1973 Wenner et al.
5,153,842 A 10/1992 Dlugos, Sr. et al.
(Continued)

FOREIGN PATENT DOCUMENTS

CA 2893502 A1 11/2004
CA 2551885 A1 8/2006
(Continued)

OTHER PUBLICATIONS

Notice of Allowance received for Singapore Patent Application No. 11201507536Q, dated Jul. 27, 2017, 6 pages.
(Continued)

*Primary Examiner* — Kevin H Flynn
*Assistant Examiner* — Grant Daniel Adkins
(74) *Attorney, Agent, or Firm* — Shook, Hardy & Bacon L.L.P.

(57) ABSTRACT

An exemplary item return shipping system is configured to: receive a request to return an item to a retailer; provide the user with a unique identifier associated with the request; and receive an indication that the user has presented the parcel and the unique identifier at an access point. The system may then facilitate placement of a pre-printed machine-readable indicia (e.g., a barcode) on the parcel at the access point and associate it with the retailer information. The system then facilitates delivery of the parcel from the access point to a handling facility and facilitates placement of a shipping label (that includes the address of a returns processing facility that is determined using the retailer information) on the parcel at the handling facility. In various embodiments, the system then facilitates shipment of the parcel to the returns processing facility.

19 Claims, 5 Drawing Sheets

(56) References Cited

U.S. PATENT DOCUMENTS

| | | | |
|---|---|---|---|
| 5,168,444 A | | 12/1992 | Cukor et al. |
| 5,375,240 A | | 12/1994 | Grundy |
| 5,400,020 A | | 3/1995 | Jones et al. |
| 5,444,444 A | | 8/1995 | Ross et al. |
| 5,623,260 A | | 4/1997 | Jones et al. |
| 5,648,770 A | | 7/1997 | Ross et al. |
| 5,656,799 A | | 8/1997 | Ramsden et al. |
| 5,657,010 A | | 8/1997 | Jones et al. |
| 5,668,543 A | | 9/1997 | Jones et al. |
| 5,726,435 A | | 3/1998 | Hara et al. |
| 5,774,053 A | | 6/1998 | Porter |
| 5,786,748 A | | 7/1998 | Nikolic et al. |
| 5,831,220 A | | 11/1998 | Ramsden et al. |
| 5,831,860 A | | 11/1998 | Foladare et al. |
| 5,979,750 A | | 11/1999 | Kindell |
| 6,010,064 A | | 1/2000 | Umeda et al. |
| 6,026,375 A | | 2/2000 | Hall et al. |
| 6,028,517 A | | 2/2000 | Sansone et al. |
| 6,047,264 A | | 4/2000 | Fisher et al. |
| 6,085,170 A | | 7/2000 | Tsukuda |
| 6,208,980 B1 | | 3/2001 | Kara |
| 6,211,781 B1 | | 4/2001 | McDonald |
| 6,220,509 B1 | | 4/2001 | Byford |
| 6,236,972 B1 | | 5/2001 | Shkedy |
| 6,278,936 B1 | | 8/2001 | Jones |
| 6,285,916 B1 | | 9/2001 | Kadaba et al. |
| 6,289,323 B1 | | 9/2001 | Gordon et al. |
| 6,304,856 B1 | | 10/2001 | Soga et al. |
| 6,313,760 B1 | | 11/2001 | Jones |
| 6,317,060 B1 | | 11/2001 | Jones |
| 6,323,254 B1 | | 11/2001 | Weikard et al. |
| 6,323,782 B1 | | 11/2001 | Stephens et al. |
| 6,343,275 B1 | | 1/2002 | Wong |
| 6,344,796 B1 | | 2/2002 | Ogilvie et al. |
| 6,356,196 B1 | | 3/2002 | Wong |
| 6,363,323 B1 | | 3/2002 | Jones |
| 6,411,891 B1 | | 6/2002 | Jones |
| 6,433,732 B1 | | 8/2002 | Dutta et al. |
| 6,442,589 B1 | | 8/2002 | Takahashi et al. |
| 6,456,900 B1 | | 9/2002 | Kakuta |
| 6,463,420 B1 | | 10/2002 | Guidice et al. |
| 6,480,758 B2 | | 11/2002 | Stevens |
| 6,486,801 B1 | | 11/2002 | Jones |
| 6,492,912 B1 | | 12/2002 | Jones |
| 6,510,383 B1 | | 1/2003 | Jones |
| 6,536,659 B1 * | | 3/2003 | Hauser .................. G06Q 30/06 235/375 |
| 6,539,360 B1 | | 3/2003 | Kadaba |
| 6,570,488 B2 | | 5/2003 | Kucharczyk et al. |
| 6,595,342 B1 | | 7/2003 | Maritzen et al. |
| 6,606,604 B1 | | 8/2003 | Dutta |
| 6,612,489 B2 | | 9/2003 | McCormick et al. |
| 6,615,092 B2 | | 9/2003 | Bickley et al. |
| 6,618,668 B1 | | 9/2003 | Laird |
| 6,634,551 B2 | | 10/2003 | Barta et al. |
| 6,683,542 B1 | | 1/2004 | Jones |
| 6,688,435 B1 | | 2/2004 | Will et al. |
| 6,690,997 B2 | | 2/2004 | Rivalto |
| 6,694,217 B2 | | 2/2004 | Bloom |
| 6,700,507 B2 | | 3/2004 | Jones |
| 6,701,299 B2 | | 3/2004 | Kraisser et al. |
| 6,714,859 B2 | | 3/2004 | Jones |
| 6,725,127 B2 | | 4/2004 | Stevens |
| 6,741,927 B2 | | 5/2004 | Jones |
| 6,748,295 B2 | | 6/2004 | Tilles et al. |
| 6,748,318 B1 | | 6/2004 | Jones |
| 6,748,320 B2 | | 6/2004 | Jones |
| 6,756,879 B2 | | 6/2004 | Shuster |
| 6,763,299 B2 | | 7/2004 | Jones |
| 6,763,300 B2 | | 7/2004 | Jones |
| 6,772,130 B1 | | 8/2004 | Karbowski et al. |
| 6,791,450 B2 | | 9/2004 | Gokcebay et al. |
| 6,804,606 B2 | | 10/2004 | Jones |
| 6,820,805 B2 | | 11/2004 | Stevens |
| 6,845,909 B2 | | 1/2005 | Bong et al. |
| 6,859,722 B2 | | 2/2005 | Jones |
| 6,862,576 B1 | | 3/2005 | Turner |
| 6,882,269 B2 | | 4/2005 | Moreno |
| 6,902,109 B2 | | 6/2005 | Barta et al. |
| 6,904,359 B2 | | 6/2005 | Jones |
| 6,933,832 B1 | | 8/2005 | Simms et al. |
| 6,950,803 B2 | | 9/2005 | Tiley et al. |
| 6,952,645 B1 | | 10/2005 | Jones |
| 6,961,711 B1 | | 11/2005 | Chee |
| 6,967,575 B1 | | 11/2005 | Dohrmann et al. |
| 6,974,928 B2 | | 12/2005 | Bloom |
| 6,975,998 B1 | | 12/2005 | Jones |
| 6,976,090 B2 | | 12/2005 | Ben-Shaul et al. |
| 6,978,929 B2 | | 12/2005 | Buie et al. |
| 6,985,871 B2 | | 1/2006 | Simon et al. |
| 6,990,467 B1 | | 1/2006 | Kwan |
| 6,994,253 B2 | | 2/2006 | Miller et al. |
| 7,020,623 B1 | | 3/2006 | Tiley et al. |
| 7,028,895 B2 | | 4/2006 | Ashaari |
| 7,030,781 B2 | | 4/2006 | Jones |
| 7,031,959 B2 | | 4/2006 | Garner et al. |
| 7,055,741 B2 | | 6/2006 | Bong et al. |
| 7,068,149 B2 | | 6/2006 | Lee et al. |
| 7,075,451 B2 | | 7/2006 | Yamada |
| 7,110,958 B2 | | 9/2006 | Yang |
| 7,133,743 B2 | | 11/2006 | Tilles et al. |
| 7,158,941 B1 | | 1/2007 | Thompson |
| 7,158,948 B1 | | 1/2007 | Rodriguez et al. |
| 7,177,825 B1 | | 2/2007 | Borders et al. |
| 7,212,829 B1 | | 5/2007 | Lau et al. |
| 7,212,984 B2 | | 5/2007 | Wolfe et al. |
| 7,222,081 B1 | | 5/2007 | Sone |
| 7,225,983 B2 | | 6/2007 | Park et al. |
| 7,233,907 B2 | | 6/2007 | Young |
| 7,248,160 B2 | | 7/2007 | Mangan et al. |
| 7,249,044 B2 | | 7/2007 | Kumar et al. |
| 7,249,087 B2 | | 7/2007 | Sharp et al. |
| 7,254,549 B1 | | 8/2007 | Bansal et al. |
| 7,257,552 B1 | | 8/2007 | Franco |
| 7,267,920 B2 | | 9/2007 | Nakazawa et al. |
| 7,312,702 B1 | | 12/2007 | Willms et al. |
| 7,337,944 B2 | | 3/2008 | Devar |
| 7,341,186 B2 | | 3/2008 | Mrozik et al. |
| 7,358,857 B1 | | 4/2008 | White |
| 7,376,598 B2 | | 5/2008 | Estes et al. |
| 7,385,499 B2 | | 6/2008 | Horton et al. |
| 7,422,149 B2 | | 9/2008 | Aptekar |
| 7,426,484 B2 | | 9/2008 | Joyce et al. |
| 7,479,899 B2 | | 1/2009 | Horstemeyer |
| 7,501,946 B2 | | 3/2009 | Lanigan et al. |
| 7,509,228 B2 | | 3/2009 | Bielefeld et al. |
| 7,511,617 B2 | | 3/2009 | Burman et al. |
| 7,528,722 B2 | | 5/2009 | Nelson |
| 7,574,366 B2 | | 8/2009 | Burman et al. |
| 7,580,845 B2 | | 8/2009 | Burman et al. |
| 7,617,133 B1 | | 11/2009 | Antony et al. |
| 7,624,024 B2 | | 11/2009 | Levis et al. |
| 7,636,696 B1 * | | 12/2009 | Sigler, Jr. ............... G06Q 20/02 705/50 |
| 7,647,231 B2 | | 1/2010 | Kuebert et al. |
| 7,653,457 B2 | | 1/2010 | Bloom |
| 7,653,603 B1 | | 1/2010 | Holtkamp, Jr. et al. |
| 7,657,466 B2 | | 2/2010 | Klingenberg et al. |
| 7,693,723 B2 | | 4/2010 | Wade |
| 7,711,654 B2 | | 5/2010 | Schmidtberg et al. |
| 7,712,670 B2 | | 5/2010 | Sauerwein, Jr. et al. |
| 7,742,928 B2 | | 6/2010 | Reynolds et al. |
| 7,752,134 B2 | | 7/2010 | Spear |
| 7,765,131 B2 | | 7/2010 | Klingenberg et al. |
| 7,769,778 B2 | | 8/2010 | Snapp et al. |
| 7,815,112 B2 | | 10/2010 | Volpe et al. |
| 7,822,618 B2 | | 10/2010 | Kaneko |
| 7,831,439 B1 | | 11/2010 | Bryar et al. |
| 7,848,961 B2 | | 12/2010 | Estes et al. |
| 7,853,481 B1 | | 12/2010 | Johnson |
| 7,868,753 B2 | | 1/2011 | Jenkins et al. |
| 7,925,524 B2 | | 4/2011 | Florence |
| 7,962,422 B1 | | 6/2011 | Melechko et al. |
| 7,969,306 B2 | | 6/2011 | Ebert et al. |

(56) References Cited

U.S. PATENT DOCUMENTS

| | | |
|---|---|---|
| 7,984,289 B2 | 7/2011 | Orbke et al. |
| 7,996,328 B1 | 8/2011 | Lundberg et al. |
| 8,010,430 B1 | 8/2011 | Chase et al. |
| 8,010,462 B2 | 8/2011 | Kinory et al. |
| 8,015,023 B1 | 9/2011 | Lee et al. |
| 8,027,933 B2 | 9/2011 | Lou et al. |
| 8,036,993 B2 | 10/2011 | Estes |
| 8,073,723 B1 | 12/2011 | Bilibin et al. |
| 8,086,546 B2 | 12/2011 | Spiegel et al. |
| 8,103,521 B2 | 1/2012 | Kuebert et al. |
| 8,103,716 B2 | 1/2012 | Boyce et al. |
| 8,108,265 B2 | 1/2012 | Bonner et al. |
| 8,117,462 B2 | 2/2012 | Snapp et al. |
| 8,131,652 B2 | 3/2012 | Gullo et al. |
| 8,140,551 B2 | 3/2012 | Garner et al. |
| 8,140,592 B2 | 3/2012 | Scott et al. |
| 8,156,007 B1 | 4/2012 | Anthony et al. |
| 8,204,799 B1 | 6/2012 | Murray et al. |
| 8,219,490 B2 | 7/2012 | Hammad et al. |
| 8,225,388 B2 | 7/2012 | Vogel et al. |
| 8,234,275 B2 | 7/2012 | Grant et al. |
| 8,249,998 B2 | 8/2012 | Reynolds et al. |
| 8,255,235 B2 | 8/2012 | Aldstadt |
| 8,255,339 B2 | 8/2012 | Andrew |
| 8,265,947 B2 | 9/2012 | Kuebert et al. |
| 8,280,824 B1 | 10/2012 | Vermeulen et al. |
| 8,291,234 B2 | 10/2012 | Snapp et al. |
| 8,306,923 B1 | 11/2012 | Roache et al. |
| 8,311,895 B1 | 11/2012 | Murugan et al. |
| 8,340,978 B2 | 12/2012 | Wade |
| 8,352,551 B2 | 1/2013 | Campbell et al. |
| 8,356,187 B2 | 1/2013 | Cook et al. |
| 8,364,953 B2 | 1/2013 | Bullard, Jr. |
| 8,380,641 B1 | 2/2013 | Bennett et al. |
| 8,392,262 B2 | 3/2013 | Mallick et al. |
| 8,437,742 B2 | 5/2013 | Garskof |
| 8,468,062 B1 | 6/2013 | Kamdar |
| 8,489,520 B2 | 7/2013 | Kuebert et al. |
| 9,141,931 B2 | 9/2015 | Ackerman |
| 9,195,950 B2 | 11/2015 | Schenken |
| 9,692,738 B1 | 6/2017 | Wenneman et al. |
| 9,916,557 B1 | 3/2018 | Gillen et al. |
| 9,984,351 B1* | 5/2018 | Antony ............... G06Q 10/08 |
| 10,007,712 B1 | 6/2018 | Williams et al. |
| 2001/0040422 A1 | 11/2001 | Gramlich |
| 2001/0042001 A1 | 11/2001 | Goto et al. |
| 2001/0042024 A1 | 11/2001 | Rogers |
| 2001/0051885 A1 | 12/2001 | Nardulli et al. |
| 2002/0007299 A1 | 1/2002 | Florence |
| 2002/0007353 A1 | 1/2002 | Kornacki |
| 2002/0010634 A1 | 1/2002 | Roman et al. |
| 2002/0013744 A1 | 1/2002 | Tsunenari et al. |
| 2002/0016726 A1 | 2/2002 | Ross |
| 2002/0019761 A1 | 2/2002 | Lidow |
| 2002/0019777 A1 | 2/2002 | Schwab et al. |
| 2002/0029194 A1 | 3/2002 | Lewis et al. |
| 2002/0032612 A1 | 3/2002 | Williams et al. |
| 2002/0032613 A1 | 3/2002 | Buettgenbach et al. |
| 2002/0035515 A1 | 3/2002 | Moreno |
| 2002/0038266 A1 | 3/2002 | Tuttrup et al. |
| 2002/0040350 A1 | 4/2002 | Shinzaki |
| 2002/0046056 A1 | 4/2002 | Demarco et al. |
| 2002/0070882 A1 | 6/2002 | Jones |
| 2002/0073039 A1 | 6/2002 | Ogg et al. |
| 2002/0080030 A1 | 6/2002 | Inomata |
| 2002/0082770 A1 | 6/2002 | Jones |
| 2002/0087371 A1 | 7/2002 | Abendroth |
| 2002/0103653 A1 | 8/2002 | Huxter |
| 2002/0103724 A1 | 8/2002 | Huxter |
| 2002/0107820 A1 | 8/2002 | Huxter |
| 2002/0111914 A1 | 8/2002 | Terada et al. |
| 2002/0120475 A1 | 8/2002 | Morimoto |
| 2002/0128915 A1 | 9/2002 | Haseltine |
| 2002/0130065 A1 | 9/2002 | Bloom |
| 2002/0138173 A1 | 9/2002 | Barta et al. |
| 2002/0143670 A1 | 10/2002 | Cushing et al. |
| 2002/0147919 A1 | 10/2002 | Gentry |
| 2002/0156645 A1 | 10/2002 | Hansen |
| 2002/0156846 A1 | 10/2002 | Rawat et al. |
| 2002/0165729 A1* | 11/2002 | Kuebert ............... G06Q 10/08 705/338 |
| 2002/0177922 A1 | 11/2002 | Bloom |
| 2002/0178016 A1 | 11/2002 | McLellan |
| 2002/0178074 A1 | 11/2002 | Bloom |
| 2002/0184497 A1 | 12/2002 | Gage et al. |
| 2003/0003936 A1 | 1/2003 | Tighe |
| 2003/0023963 A1 | 1/2003 | Birkholz et al. |
| 2003/0025590 A1 | 2/2003 | Gokcebay et al. |
| 2003/0037009 A1 | 2/2003 | Tobin et al. |
| 2003/0040931 A1 | 2/2003 | De Mol Van Otterloo et al. |
| 2003/0040980 A1 | 2/2003 | Nakajima et al. |
| 2003/0046173 A1 | 3/2003 | Benjier et al. |
| 2003/0093180 A1 | 5/2003 | Stevens |
| 2003/0097287 A1 | 5/2003 | Franz et al. |
| 2003/0110170 A1 | 6/2003 | Matsuoka |
| 2003/0114206 A1 | 6/2003 | Timothy et al. |
| 2003/0160097 A1 | 8/2003 | Steiner |
| 2003/0171996 A1 | 9/2003 | Chen et al. |
| 2003/0193414 A1 | 10/2003 | Jones |
| 2003/0195784 A1 | 10/2003 | Smith, Jr. |
| 2003/0225625 A1 | 12/2003 | Chew et al. |
| 2004/0015393 A1 | 1/2004 | Fong et al. |
| 2004/0030604 A1 | 2/2004 | Young |
| 2004/0039712 A1 | 2/2004 | Tartal et al. |
| 2004/0044582 A1 | 3/2004 | Chowdhary et al. |
| 2004/0073449 A1 | 4/2004 | Yang |
| 2004/0073499 A1 | 4/2004 | Martin et al. |
| 2004/0088225 A1 | 5/2004 | Foth et al. |
| 2004/0093312 A1 | 5/2004 | Cordery et al. |
| 2004/0117276 A1 | 6/2004 | Kettler, III |
| 2004/0117278 A1 | 6/2004 | Dutta et al. |
| 2004/0117326 A1 | 6/2004 | Amato |
| 2004/0133446 A1 | 7/2004 | Myrick et al. |
| 2004/0134690 A1 | 7/2004 | Norris et al. |
| 2004/0143518 A1 | 7/2004 | Siegel |
| 2004/0149822 A1 | 8/2004 | Stevens |
| 2004/0149824 A1 | 8/2004 | Miller et al. |
| 2004/0153370 A1 | 8/2004 | Yang |
| 2004/0158351 A1 | 8/2004 | Rivalto |
| 2004/0172260 A1 | 9/2004 | Junger et al. |
| 2004/0181310 A1 | 9/2004 | Stashluk, Jr. et al. |
| 2004/0199284 A1 | 10/2004 | Hara |
| 2004/0199656 A1 | 10/2004 | Pintsov |
| 2004/0211834 A1 | 10/2004 | Fleckenstein et al. |
| 2004/0215480 A1 | 10/2004 | Kadaba |
| 2004/0215588 A1 | 10/2004 | Cornelius |
| 2004/0254802 A1* | 12/2004 | Miller ............... G06Q 10/08 705/337 |
| 2004/0254811 A1 | 12/2004 | Horstemeyer |
| 2004/0260470 A1 | 12/2004 | Rast |
| 2005/0004877 A1 | 1/2005 | McLellan et al. |
| 2005/0006470 A1 | 1/2005 | Mrozik et al. |
| 2005/0027607 A1 | 2/2005 | Pearson |
| 2005/0038758 A1 | 2/2005 | Hilbush et al. |
| 2005/0060164 A1 | 3/2005 | Eli Berl Illion |
| 2005/0060228 A1 | 3/2005 | Woo |
| 2005/0061877 A1 | 3/2005 | Stevens |
| 2005/0068178 A1 | 3/2005 | Lee et al. |
| 2005/0071258 A1 | 3/2005 | Kumakawa |
| 2005/0075989 A1 | 4/2005 | Biasi et al. |
| 2005/0080635 A1 | 4/2005 | Groff et al. |
| 2005/0080638 A1 | 4/2005 | Maseruka |
| 2005/0104716 A1 | 5/2005 | Simms et al. |
| 2005/0116033 A1 | 6/2005 | Moore |
| 2005/0119786 A1 | 6/2005 | Kadaba |
| 2005/0120003 A1 | 6/2005 | Drury et al. |
| 2005/0131774 A1 | 6/2005 | Huxter |
| 2005/0137901 A1 | 6/2005 | Siegel |
| 2005/0138382 A1 | 6/2005 | Hougaard et al. |
| 2005/0149372 A1 | 7/2005 | Kite et al. |
| 2005/0216553 A1 | 9/2005 | Mallonee et al. |
| 2005/0218222 A1 | 10/2005 | Nark et al. |
| 2005/0234911 A1 | 10/2005 | Hess et al. |
| 2005/0251402 A1 | 11/2005 | Olsen et al. |

(56) References Cited

U.S. PATENT DOCUMENTS

| | | |
|---|---|---|
| 2006/0010037 A1 | 1/2006 | Angert |
| 2006/0010077 A1 | 1/2006 | Dohrmann et al. |
| 2006/0020366 A1 | 1/2006 | Bloom |
| 2006/0020489 A1 | 1/2006 | Rivalto |
| 2006/0041481 A1 | 2/2006 | Stowe |
| 2006/0047610 A1 | 3/2006 | Parkos et al. |
| 2006/0069601 A1 | 3/2006 | Simon et al. |
| 2006/0085273 A1 | 4/2006 | Mayer et al. |
| 2006/0097896 A1 | 5/2006 | Jones |
| 2006/0149577 A1 | 7/2006 | Stashluk et al. |
| 2006/0224512 A1 | 10/2006 | Kurakata |
| 2006/0229895 A1 | 10/2006 | Kodger |
| 2006/0235739 A1 | 10/2006 | Levis et al. |
| 2006/0238334 A1 | 10/2006 | Mangan et al. |
| 2006/0282277 A1 | 12/2006 | Ng |
| 2006/0287870 A1 | 12/2006 | Mayer et al. |
| 2007/0005452 A1 | 1/2007 | Klingenberg et al. |
| 2007/0016538 A1 | 1/2007 | Bielefeld et al. |
| 2007/0036117 A1 | 2/2007 | Taube et al. |
| 2007/0047459 A1 | 3/2007 | Kadaba |
| 2007/0062851 A1 | 3/2007 | Schulz et al. |
| 2007/0078797 A1 | 4/2007 | Won et al. |
| 2007/0083410 A1 | 4/2007 | Hanna |
| 2007/0095904 A1 | 5/2007 | Barta et al. |
| 2007/0124295 A1 | 5/2007 | Forman et al. |
| 2007/0143281 A1 | 6/2007 | Smirin et al. |
| 2007/0150533 A1 | 6/2007 | Krause et al. |
| 2007/0156415 A1 | 7/2007 | Foth et al. |
| 2007/0185598 A1 | 8/2007 | Ortega |
| 2007/0192191 A1 | 8/2007 | Neal et al. |
| 2007/0198290 A1 | 8/2007 | Kinory et al. |
| 2007/0266081 A1 | 11/2007 | Murchison et al. |
| 2008/0004928 A1 | 1/2008 | Trellevik et al. |
| 2008/0004957 A1 | 1/2008 | Hildreth et al. |
| 2008/0004967 A1 | 1/2008 | Gillen |
| 2008/0004995 A1 | 1/2008 | Klingenberg et al. |
| 2008/0040246 A1 | 2/2008 | Fukamachi |
| 2008/0051995 A1 | 2/2008 | Lokshin et al. |
| 2008/0061966 A1 | 3/2008 | Nelson |
| 2008/0082346 A1 | 4/2008 | Hoopes et al. |
| 2008/0109246 A1 | 5/2008 | Russell |
| 2008/0121682 A1 | 5/2008 | Grim et al. |
| 2008/0133261 A1 | 6/2008 | Ray |
| 2008/0154781 A1* | 6/2008 | Kumar .............. G06Q 20/382 705/64 |
| 2008/0172305 A1 | 7/2008 | Estes et al. |
| 2008/0210749 A1 | 9/2008 | Skaaksrud et al. |
| 2008/0221913 A1 | 9/2008 | Cook et al. |
| 2008/0249830 A1 | 10/2008 | Gilman et al. |
| 2008/0313018 A1 | 12/2008 | Kamm, IV et al. |
| 2008/0319970 A1 | 12/2008 | Garner et al. |
| 2008/0320092 A1 | 12/2008 | Campbell et al. |
| 2009/0001153 A1 | 1/2009 | Lim |
| 2009/0012802 A1 | 1/2009 | Pinney |
| 2009/0043552 A1 | 2/2009 | Tomlinson, Jr. et al. |
| 2009/0046892 A1 | 2/2009 | Avant et al. |
| 2009/0063215 A1 | 3/2009 | Heise et al. |
| 2009/0106124 A1 | 4/2009 | Yang |
| 2009/0138730 A1 | 5/2009 | Cook et al. |
| 2009/0146832 A1 | 6/2009 | Ebert et al. |
| 2009/0164295 A1 | 6/2009 | Sion |
| 2009/0173672 A1 | 7/2009 | Avant et al. |
| 2009/0187489 A1 | 7/2009 | Mallick et al. |
| 2009/0240597 A1 | 9/2009 | Oswald |
| 2009/0259509 A1 | 10/2009 | Landvater |
| 2009/0281929 A1 | 11/2009 | Boitet et al. |
| 2009/0314835 A1 | 12/2009 | Jackson |
| 2009/0319078 A1 | 12/2009 | Jackson |
| 2009/0326971 A1 | 12/2009 | Piccinini et al. |
| 2010/0004960 A1 | 1/2010 | Frankenberg et al. |
| 2010/0011238 A1 | 1/2010 | Nakamura et al. |
| 2010/0012769 A1 | 1/2010 | Alber et al. |
| 2010/0049536 A1 | 2/2010 | Quine et al. |
| 2010/0057592 A1 | 3/2010 | Moir et al. |
| 2010/0057593 A1 | 3/2010 | Moir et al. |
| 2010/0076903 A1 | 3/2010 | Klingenberg et al. |
| 2010/0100497 A1 | 4/2010 | Kuebert et al. |
| 2010/0114678 A1 | 5/2010 | Axe et al. |
| 2010/0121689 A1 | 5/2010 | Wallace et al. |
| 2010/0138281 A1 | 6/2010 | Zhang et al. |
| 2010/0162149 A1 | 6/2010 | Sheleheda et al. |
| 2010/0185565 A1 | 7/2010 | Wade |
| 2010/0211444 A1 | 8/2010 | Spear |
| 2010/0223127 A1 | 9/2010 | Bettez et al. |
| 2010/0223134 A1 | 9/2010 | Lunenfeld |
| 2010/0235290 A1 | 9/2010 | Junger et al. |
| 2010/0250291 A1 | 9/2010 | Walker et al. |
| 2010/0280955 A1 | 11/2010 | Ross et al. |
| 2011/0004562 A1 | 1/2011 | Hennessy et al. |
| 2011/0084162 A1 | 4/2011 | Goossen et al. |
| 2011/0093361 A1 | 4/2011 | Morales |
| 2011/0125665 A1 | 5/2011 | Kadaba |
| 2011/0153513 A1 | 6/2011 | Erie et al. |
| 2011/0191697 A1 | 8/2011 | Sumner et al. |
| 2011/0246323 A1 | 10/2011 | Mehta et al. |
| 2011/0270714 A1 | 11/2011 | Myrick et al. |
| 2011/0287748 A1 | 11/2011 | Angel et al. |
| 2011/0288896 A1 | 11/2011 | Dewey, Jr. et al. |
| 2012/0016948 A1 | 1/2012 | Sinha |
| 2012/0030124 A1 | 2/2012 | Cronkright, II et al. |
| 2012/0030133 A1 | 2/2012 | Rademaker |
| 2012/0047084 A1 | 2/2012 | Naghshineh et al. |
| 2012/0047085 A1 | 2/2012 | Naghshineh et al. |
| 2012/0062362 A1 | 3/2012 | Rudduck et al. |
| 2012/0089532 A1 | 4/2012 | Kuebert et al. |
| 2012/0095934 A1 | 4/2012 | Klingenberg et al. |
| 2012/0130625 A1 | 5/2012 | Srivastava |
| 2012/0130916 A1 | 5/2012 | Neal et al. |
| 2012/0166320 A1 | 6/2012 | Junger |
| 2012/0179622 A1 | 7/2012 | Amato |
| 2012/0185363 A1 | 7/2012 | Gilbert |
| 2012/0235786 A1 | 9/2012 | Rudduck et al. |
| 2012/0246077 A1 | 9/2012 | Skaaksrud et al. |
| 2012/0303539 A1 | 11/2012 | Marcus et al. |
| 2012/0303541 A1 | 11/2012 | Marcus et al. |
| 2012/0303542 A1 | 11/2012 | Marcus et al. |
| 2012/0310853 A1 | 12/2012 | Aldstadt |
| 2012/0330774 A1 | 12/2012 | Sadot et al. |
| 2013/0006731 A1 | 1/2013 | Cook et al. |
| 2013/0006885 A1 | 1/2013 | Kuebert et al. |
| 2013/0013101 A1 | 1/2013 | Bonnell et al. |
| 2013/0013102 A1 | 1/2013 | Bonnell et al. |
| 2013/0013350 A1 | 1/2013 | McCullough et al. |
| 2013/0016636 A1 | 1/2013 | Berger et al. |
| 2013/0018894 A1 | 1/2013 | Qiao |
| 2013/0018999 A1 | 1/2013 | Merrill et al. |
| 2013/0024307 A1 | 1/2013 | Fuerstenberg et al. |
| 2013/0054054 A1 | 2/2013 | Tollenaere et al. |
| 2013/0061337 A1 | 3/2013 | Zimberoff et al. |
| 2013/0073336 A1 | 3/2013 | Heath |
| 2013/0073605 A1 | 3/2013 | Fosburgh et al. |
| 2013/0088323 A1 | 4/2013 | Ryan |
| 2013/0144428 A1 | 6/2013 | Irwin et al. |
| 2013/0151419 A1 | 6/2013 | Hitchcock et al. |
| 2013/0166067 A1 | 6/2013 | Irwin et al. |
| 2013/0202185 A1 | 8/2013 | Irwin, Jr. et al. |
| 2013/0238599 A1 | 9/2013 | Burris |
| 2013/0238658 A1 | 9/2013 | Burris |
| 2013/0246396 A1 | 9/2013 | Clare et al. |
| 2013/0262311 A1 | 10/2013 | Buhrmann et al. |
| 2013/0262336 A1 | 10/2013 | Wan et al. |
| 2013/0268437 A1 | 10/2013 | Desai et al. |
| 2013/0338822 A1 | 12/2013 | Gibson, Jr. et al. |
| 2014/0034727 A1 | 2/2014 | Hancock et al. |
| 2014/0035721 A1 | 2/2014 | Heppe et al. |
| 2014/0052661 A1 | 2/2014 | Shakes et al. |
| 2014/0081677 A1 | 3/2014 | Craig et al. |
| 2014/0180959 A1 | 6/2014 | Gillen et al. |
| 2014/0222711 A1 | 8/2014 | Tibbs et al. |
| 2014/0236688 A1 | 8/2014 | Minter et al. |
| 2014/0258098 A1 | 9/2014 | Felix et al. |
| 2014/0278602 A1 | 9/2014 | Lievens et al. |
| 2014/0278603 A1 | 9/2014 | Lievens et al. |
| 2014/0278843 A1 | 9/2014 | Lievens et al. |

(56) References Cited

U.S. PATENT DOCUMENTS

| | | | |
|---|---|---|---|
| 2014/0279648 A1* | 9/2014 | Whitehouse | G06Q 10/083 705/330 |
| 2014/0279650 A1 | 9/2014 | Lievens et al. | |
| 2014/0279654 A1 | 9/2014 | Lievens et al. | |
| 2014/0279658 A1 | 9/2014 | Lievens et al. | |
| 2014/0279663 A1 | 9/2014 | Lievens et al. | |
| 2014/0279664 A1 | 9/2014 | Lievens et al. | |
| 2014/0279665 A1 | 9/2014 | Lievens et al. | |
| 2014/0279666 A1 | 9/2014 | Lievens et al. | |
| 2014/0279667 A1 | 9/2014 | Gillen | |
| 2014/0330407 A1 | 11/2014 | Corder et al. | |
| 2015/0058163 A1 | 2/2015 | Lenahan et al. | |
| 2015/0106291 A1 | 4/2015 | Robinson et al. | |
| 2015/0106292 A1 | 4/2015 | Robinson et al. | |
| 2015/0106293 A1 | 4/2015 | Robinson et al. | |
| 2015/0106294 A1 | 4/2015 | Robinson et al. | |
| 2015/0106295 A1 | 4/2015 | Robinson et al. | |
| 2015/0106296 A1 | 4/2015 | Robinson et al. | |
| 2015/0120602 A1 | 4/2015 | Huffman et al. | |
| 2015/0138382 A1 | 5/2015 | Mao et al. | |
| 2015/0193731 A1 | 7/2015 | Stevens et al. | |
| 2016/0071051 A1 | 3/2016 | Tibbs et al. | |
| 2016/0140486 A1 | 5/2016 | Tibbs et al. | |
| 2016/0140487 A1 | 5/2016 | Tibbs et al. | |
| 2016/0148154 A1 | 5/2016 | Tibbs et al. | |
| 2016/0189466 A1 | 6/2016 | Gibson et al. | |
| 2018/0005184 A1 | 1/2018 | Schenken | |
| 2018/0025319 A1 | 1/2018 | Lievens et al. | |
| 2018/0060800 A1 | 3/2018 | Robinson | |
| 2018/0060812 A1 | 3/2018 | Robinson et al. | |
| 2018/0253688 A1 | 9/2018 | Schenken et al. | |
| 2019/0172011 A1 | 6/2019 | Robinson et al. | |

FOREIGN PATENT DOCUMENTS

| | | | |
|---|---|---|---|
| CN | 1317758 A | 10/2001 | |
| CN | 1571975 A | 1/2005 | |
| CN | 1666214 A | 9/2005 | |
| CN | 1795461 A | 6/2006 | |
| CN | 101203873 A | 6/2008 | |
| CN | 101329752 A | 11/2008 | |
| CN | 101491051 A | 7/2009 | |
| CN | 101971201 A | 2/2011 | |
| CN | 102609783 A | 7/2012 | |
| CN | 102930655 A | 2/2013 | |
| CN | 202720725 U | 2/2013 | |
| EP | 1152356 A2 | 11/2001 | |
| EP | 1365198 A1 | 11/2003 | |
| EP | 2469291 A1 | 6/2012 | |
| JP | S62121108 U | 7/1987 | |
| JP | 5-211684 A | 8/1993 | |
| JP | H10207956 A | 8/1998 | |
| JP | 11139540 A | 5/1999 | |
| JP | H11151154 A | 6/1999 | |
| JP | 2000339373 A | 12/2000 | |
| JP | 200114393 A | 1/2001 | |
| JP | 200122678 A | 1/2001 | |
| JP | 2001-282974 A | 10/2001 | |
| JP | 2001291027 A | 10/2001 | |
| JP | 2001338030 A | 12/2001 | |
| JP | 200256307 A | 2/2002 | |
| JP | 2002042008 A | 2/2002 | |
| JP | 2002092505 A | 3/2002 | |
| JP | 2002-109409 A | 4/2002 | |
| JP | 2002157541 A | 5/2002 | |
| JP | 2002259553 A | 9/2002 | |
| JP | 2002288562 A | 10/2002 | |
| JP | 2003196354 A | 7/2003 | |
| JP | 2003263599 A | 9/2003 | |
| JP | 2003321124 A | 11/2003 | |
| JP | 2004-030159 A | 1/2004 | |
| JP | 2004280468 A | 10/2004 | |
| JP | 2004338824 A | 12/2004 | |
| JP | 2005-43974 A | 2/2005 | |
| JP | 2006-512635 A | 4/2006 | |
| JP | 2008-542886 A | 6/2006 | |
| JP | 2006277199 A | 10/2006 | |
| JP | 2007153618 A | 6/2007 | |
| JP | 2008303069 A | 12/2008 | |
| JP | 2010128535 A | 6/2010 | |
| JP | 2011118611 A | 6/2011 | |
| JP | 2012138000 A | 7/2012 | |
| KR | 2001-0093768 A | 3/2001 | |
| WO | 00/19170 A1 | 4/2000 | |
| WO | 0019171 A1 | 4/2000 | |
| WO | 0030014 A1 | 5/2000 | |
| WO | 0046726 A2 | 8/2000 | |
| WO | 0046728 A2 | 8/2000 | |
| WO | 0052422 A1 | 9/2000 | |
| WO | 01/08071 A1 | 2/2001 | |
| WO | 0116889 A1 | 3/2001 | |
| WO | 0120423 A2 | 3/2001 | |
| WO | 0129778 A1 | 4/2001 | |
| WO | 0135344 A2 | 5/2001 | |
| WO | 0139031 A2 | 5/2001 | |
| WO | 0165451 A1 | 9/2001 | |
| WO | 0165454 A2 | 9/2001 | |
| WO | 0165523 A1 | 9/2001 | |
| WO | 0165524 A1 | 9/2001 | |
| WO | 0167344 A1 | 9/2001 | |
| WO | 0172109 A2 | 10/2001 | |
| WO | 0184359 A2 | 11/2001 | |
| WO | 0188831 A2 | 11/2001 | |
| WO | 0197101 A2 | 12/2001 | |
| WO | 0207104 A1 | 1/2002 | |
| WO | 0217045 A2 | 2/2002 | |
| WO | 02052378 A2 | 7/2002 | |
| WO | 02073369 A2 | 9/2002 | |
| WO | WO02073369 | 9/2002 | |
| WO | 02080436 A2 | 10/2002 | |
| WO | WO02080436 | 10/2002 | |
| WO | 03023688 A2 | 3/2003 | |
| WO | 03040979 A1 | 5/2003 | |
| WO | 2004015518 A2 | 2/2004 | |
| WO | 2004042523 A2 | 5/2004 | |
| WO | 2007055769 A2 | 5/2007 | |
| WO | 2010123611 A1 | 10/2010 | |
| WO | 2011/074500 A1 | 6/2011 | |
| WO | 2012129529 A1 | 9/2012 | |
| WO | 2013106940 A1 | 7/2013 | |
| WO | 2014031691 A2 | 2/2014 | |
| WO | 2014164853 A2 | 10/2014 | |

OTHER PUBLICATIONS

Office Action received for Chinese Patent Application No. 201480026776.9, dated Jul. 4, 2017, 9 Pages (Official Copy Only) (See attached Communication 37 CFR § 1.98(a) (3)).

Office Action received for Japanese Patent Application No. 2016-501276, dated Jun. 27, 2017, 5 pages (Official Copy Only) (See attached Communication 37 CFR § 1.98(a) (3)).

Office Action received for Japanese Patent Application No. 2016-501304, dated Aug. 29, 2017, 4 Pages (Official Copy Only) (See attached Communication 37 CFR § 1.98(a) (3)).

Office Action received for Japanese Patent Application No. 2017-174116, dated Aug. 14, 2018, 3 Pages (Official Copy Only) (See attached Communication 37 CFR § 1.98(a) (3)).

PCT International Preliminary Report on Patentability, dated Apr. 28, 2016, from corresponding International Application Serial No. PCT/US2014/060482.

PCT International Search Report, dated May 2, 2016, from corresponding International Application Serial No. PCT/US2015/0060757.

Written Opinion of the International Searching Authority, dated May 2, 2016, from corresponding International Application Serial No. PCT/US2015/0060757.

Non-Final Office Action received for U.S. Appl. No. 14/514,228, dated Nov. 30, 2018, 45 pages.

Office Action received for Canadian Patent Application No. 2,905,338, dated Oct. 2, 2018, 8 pages.

(56) References Cited

OTHER PUBLICATIONS

McNamara, Paul, "'Doorman' kiosk accepts package deliveries when you're not home", Network world, Available at: <https://www.networkworld.com/article/2348365/data-center/-doorman-kiosk-accepts-package-deliveries-when-you-re-not-home.html>, Aug. 8, 2007, 4 pages.
Non-Final Office Action received for U.S. Appl. No. 14/942,757, dated Jul. 19, 2018, 25 pages.
Notice of Allowance received for Singapore Patent Application No. 11201507531R, dated Jul. 19, 2018, 7 pages.
Final Office Action received for U.S. Appl. No. 14/514,000, dated Feb. 12, 2018, 43 pages.
Final Office Action received for U.S. Appl. No. 14/514,155, dated Oct. 20, 2016, 18 pages.
International Preliminary Report on Patentability received for PCT Patent Application No. PCT/US2014/060525, completed on Dec. 10, 2015, 12 pages.
Non-Final Office Action received for U.S. Appl. No. 14/514,155, dated Jun. 11, 2018, 23 pages.
Non-Final Office Action received for U.S. Appl. No. 14/561,041, dated Mar. 30, 2018, 57 pages.
Non-Final Office Action received for U.S. Appl. No. 14/935,257, dated Apr. 20, 2017, 16 pages.
Non-Final Office Action received for U.S. Appl. No. 14/200,681, dated Jul. 25, 2016, 17 pages.
Office Action received for European Patent Application No. 14714534.6, dated May 26, 2017, 5 pages.
Office Action received for Japanese Patent Application No. 2016-501276, dated Nov. 1, 2016, 8 pages (4 pages of English Translation and 4 pages of Official Copy).
Office Action received for Japanese Patent Application No. 2016-501288, dated Nov. 1, 2016, 7 pages (3 pages of English Translation and 4 pages of Official copy).
Search Report and Written Opinion received for Singapore Patent Application No. 11201507531R, dated Jun. 27, 2016, 11 pages.
Search Report and Written Opinion received for Singapore Patent Application No. 11201507549S, dated May 31, 2016, 11 pages.
Summons to Attend Oral Proceedings received for European Patent Application No. 14854011.5, mailed on Apr. 3, 2018, 13 pages.
Pender, Lee, Hard Times Are the Best Times, Magazine, Aug. 15, 2001 (Retrieved on Apr. 25, 2003), p. 3, Paragraph 3, Retrieved from the Internet: <URL:http://www.cio.com/archive/081501/besttimes_contenl.html>.
Raco Industries, "Increase Delivery Visibility and Simplify Your Process," retrieved from <http://www.racointeractive.com/media/834/raco_interactive-pd.pdf>, on Sep. 25, 2013, 2 pages.
SEP leads €26 million funding round for Kiala, http://www.sep.co.uklnews/story/sep-leads-e26-million-funding-round-for-kiala-2/, Nov. 30, 2007, SEP Scottish Equity Partners.
Van Huzien, Gordon, Messaging: The Transport Part ofThe XML Puzzle, Article, Jul. 2000 (Retrieved from the Internet Apr. 25, 2003: <URL:http:I/www-1 06.ibm.com/developerworks/library/xml-messaging/>.
ASP V16-System Walker List Works Manual (relevant part); p. 88, line 5, 3.4 Start up and termination of Lis! Works writer; one page.
Brewin, Bob and Rosencrance, Linda, Follow That Package!, Article, Mar. 19, 2001 (Retrieved from the Internet Apr. 25, 2003), p. 1-p. 5, Retrieved from the Internet: URL:http://www.computerworld.com./printth is/200 1/0,4814,58696, DO .him l, Computer World.
Caminiti et al., United Parcel Service Introduces Advanced Label Imaging System, Published by Business Wire on Nov. 29, 1989, Section 1, p. 1, Downloaded from the Internet on Sep. 19, 2005, 2 Pages.
De Marco, Donna, E-Tail Presents Can Be Tougher to Send Back Than Order, Journal, Dec. 28, 1999, Downloaded from the Internet on Oct. 3, 2002, Accession No. 08891512, Knight-Ridder/Tribune Business News, The Dialog Corporation, United States.
Descartes, Scheduling Software Helps Webvan Meet 3D-Minute Delivery Window, www.stores.org, Jul. 2000.
El Portal Del Transporte, Fed Ex Insight Empowers Customers with Enhanced Shipment Visibility and Control, Article, Apr. 11, 2001 (Retrieved on Apr. 25, 2003), p. 9, Paragraph 4—p. 10, Line 7, Retrieved from the Internet: <U RL:http://www. transportando.nel/newsabri 1_ completa .him>.
Fed Ex, "RPS Adds Automated Package Pick-Up to Redesigned Web Site," www.fedex.com/us/aboul/gound/www.fedex.com/us/aboul/gound/ pressreleases/pressrelease111198.hlml?link=4, retrieved Sep. 10, 2003.
Fedex, "Fed Ex Mobile Ship", retrieved from <hllp:l/www.fedex.com/us/mobile/label.hlml, redirected to http://mobilesolutions.fedex.com/shipping-label.hlml > on Sep. 25, 2013, 2 pages.
Frontline Solutions, Fed Ex Improves Internal, External Operations, Article, Apr. 5, 2001 (Retrieved from the Internet Apr. 25, 2003), p. 1 (last line) through p. 2, Paragraph 9, Retrieved from the Internet: <URL:http://www.frontlinemagazine.com/art_lh/o4052001.hlx>, Fairfax, Virginia and Memphis, Tennessee.
Gao, Huiji, et al., Cyber-Physical-Social Systems: Harnessing the Crowdsourcing Power of Social Media for Disaster Relief, IEEE Intelligent Systems, Copyright 2011, pp. 10-14, IEEE Computer Society.
Harrington, Lisa, The U.S. Postal Service Gets Serious About Serving Business in the New Economy, Journal, May 2000, Downloaded from the Internet on Oct. 3, 2002, p. 2, vol. 41, No. 5, Accession No. 01167257, Penton Publishing, Inc., United States of America.
Henderson, Timothy, Buy.com Boosts Returns Process Efficiency With New Solution, Periodical, Nov. 2000, Downloaded from the Internet on Oct. 3, 2002, pp. 72-76, vol. 82n11, Accession No. 02102731, ProQuest Info&Learning, United States of America.
IPventure, "Schedule Distribution Routes and Timeslots," http://www.ipventure.com/onlineorder/distribution.php, retrieved on Apr. 16, 2008.
Kihon Kara Jissen Made Business Seikou No Tameno Kanpeki Guide—How to E-Commerce (relevant part); p. 60; one page.
Many Happy Returns—UPS Unvels Advanced Outline Returns Solution, Journal, Sep. 20, 2000, Downloaded from the Internet on Oct. 3, 2002, Accession No. 12921102, Business Wire, United States of America.
Outlook 2000 Handbook First Edition (relevant part); p. 95, last 9 lines; one page.
Lindsay, Bruce R., "Congressional Research Service, Social Media and Disasters: Current Uses, Future Options, and Policy Considerations," CRS Report for Congress, Sep. 6, 2011, 10 pages, Congressional Research Service.
Notice of Allowance received for U.S. Appl. No. 14/200,432, dated Feb. 7, 2019, 22 pages.
Final Office Action received for U.S. Appl. No. 14/942,757, dated Mar. 21, 2019, 26 pages.
Office Action received for Chinese Patent Application No. 201480067863.9, dated Dec. 24, 2018, 39 pages (15 pages of English Translation and 24 pages of Official Copy).
Non-Final Office Action received for U.S. Appl. No. 14/514,155, dated Sep. 28, 2018, 29 pages.
Notice of Allowance received for U.S. Appl. No. 14/514,276, dated Oct. 3, 2018, 11 pages.
Office Action received for Chinese Patent Application No. 201480026789.6, dated Jul. 23, 2018, 17 pages (Official Copy Only) (See attached Communication 37 CFR § 1.98(a) (3)).
Chung et al., "Optimal Replenishment Policies for EOQ Inventory Model with Limited Storage Capacity Under Permissible Delay in Payments", Opsearch 41.1, 2004, 23 pages.
Notice of Allowance received for U.S. Appl. No. 14/170,298, dated May 22, 2019, 10 pages.
Final Office Action received for U.S. Appl. No. 14/514,155, dated Jun. 21, 2019, 28 pages.

* cited by examiner

SYSTEMS AND METHODS FOR FACILITATING SHIPPING OF PARCELS FOR RETURNING ITEMS

CROSS REFERENCE TO RELATED APPLICATION

This application claims the benefit of U.S. Provisional Application No. 62/080,130, filed Nov. 14, 2014, entitled "SYSTEMS AND METHODS FOR FACILITATING SHIPPING OF PARCELS FOR RETURNING ITEMS," which is hereby incorporated by reference in its entirety.

BACKGROUND

Currently, there are few options for most customers to return items purchased from e-commerce stores. A customer may both obtain and fill out a traditional shipping label that is provided by a common carrier, the customer may use a suitable software program to print an appropriate shipping label on a computer printer, or the customer may utilize a preprinted shipping label provided by the e-commerce store. In any case, once the label is complete, the user typically affixes the label to the parcel and transfers the labeled parcel to the common carrier for shipment back to the e-commerce store by, for example, dropping the parcel off at a drop box or other pickup location associated with the common carrier. This process may be inconvenient for customers who, for example, may not have access to a computer printer, or for customers of e-commerce stores that do not provide pre-printed return shipping labels. Accordingly, there is a need for providing shipping solutions that do not require customers to print a suitable label or to obtain pre-preprinted shipping labels in order to facilitate the return of an item to a retailer.

SUMMARY

A computer-implemented method of enabling a user to return an item to a retailer via an access point (e.g., an attended parcel pickup/delivery location), according to various embodiments, comprises: (1) receiving, by a processor, from a first entity computing device associated with a user, a request to ship a parcel containing the item, the request including shipping information associated with a retailer from which the item was purchased; (2) at least partially in response to receiving the request, generating, by a processor, a first unique identifier and associating, by a processor, the shipping information with the first unique identifier; (3) receiving, by a processor, confirmation of receipt of the parcel and presentation of the first unique identifier at an access point; (4) at least partially in response to receiving confirmation of the receipt of the parcel and the presentation of the first unique identifier, facilitating, by a processor, placement of a label (e.g., a pre-printed label) on the parcel that includes a second unique identifier which, for example, may be in the form of a barcode or other suitable machine-readable indicia; (5) associating, by a processor, the second unique identifier with the shipping information in a data store; (6) facilitating shipment, by a processor, of the parcel from the access point to a handling facility; (7) reading, by a processor, the label and using, by a processor, information from the label (e.g., the second unique identifier) to retrieve the shipping information from the data store; (8) at least partially in response to retrieving the shipping information, facilitating, by a processor, printing of a shipping label comprising the shipping information and placement of the shipping label on the parcel at the handling facility; and (9) facilitating, by the processor, delivery of the parcel from the handling facility to the retailer based at least in part on the shipping information. In particular embodiments, the first entity may be the user attempting to return the item. In other embodiments, the first entity may be the retailer initiating the return on behalf of a customer.

A non-transitory computer-readable medium, in particular embodiments, stores computer-executable instructions for: (1) receiving, from a user, a request to return an item purchased from a particular retailer; (2) at least partially in response to receiving the request, providing the user a selection of one or more retailers from which to select the particular retailer; (3) at least partially in response to receiving the selected particular retailer from the user: (a) generating a first unique identifier; (b) associating the first unique identifier with the particular retailer and/or a particular address associated with the particular retailer; and (c) providing the first unique identifier to the user. In various embodiments, the non-transitory computer-readable medium further stores computer-executable instructions for: (1) receiving an indication at an access point that the user has presented a parcel containing the item and the unique identifier; and (2) at least partially in response to receiving the indication: (a) associating a pre-printed barcode with the particular retailer (and/or particular address) and the request, and (b) facilitating placement of the pre-printed barcode on the parcel at the access point. In various embodiments, the non-transitory computer-readable medium further stores computer-executable instructions for: (1) facilitating delivery of the parcel from the access point to a shipping hub; (2) receiving confirmation of delivery of the parcel at the shipping hub; (3) at least partially in response to receiving confirmation of the delivery, facilitating placement of a shipping label on the parcel, the shipping label containing the shipping information associated with the particular retailer; and (4) facilitating shipment of the parcel from the shipping hub to a final destination, the final destination being based at least in part on the shipping information associated with the particular retailer.

A computer system, in various embodiments, comprises at least one processor. In various embodiments, the computer system is configured for: (1) receiving a request from a retailer to ship a parcel, the parcel containing one or more items purchased from the retailer by a customer; (2) associating the request with a unique identifier; (3) providing the unique identifier to the customer; (4) receiving the unique identifier at an access point; (5) facilitating placement of a barcode on the parcel; (6) associating the barcode with the unique identifier; (7) facilitating delivery of the parcel from the access point to a shipping hub; (8) receiving confirmation of the delivery of the parcel to the shipping hub; (9) at least partially in response to receiving confirmation of the delivery, facilitating placement of shipping information associated with the retailer on the parcel; and (10) facilitating delivery of the parcel to a final destination, where the final destination is based at least in part on the shipping information associated with the retailer.

BRIEF DESCRIPTION OF THE DRAWINGS

Various embodiments of a system and method for returning of items are described below. In the course of this description, reference will be made to the accompanying drawings, which are not necessarily drawn to scale, and wherein.

DETAILED DESCRIPTION

Figure 1:
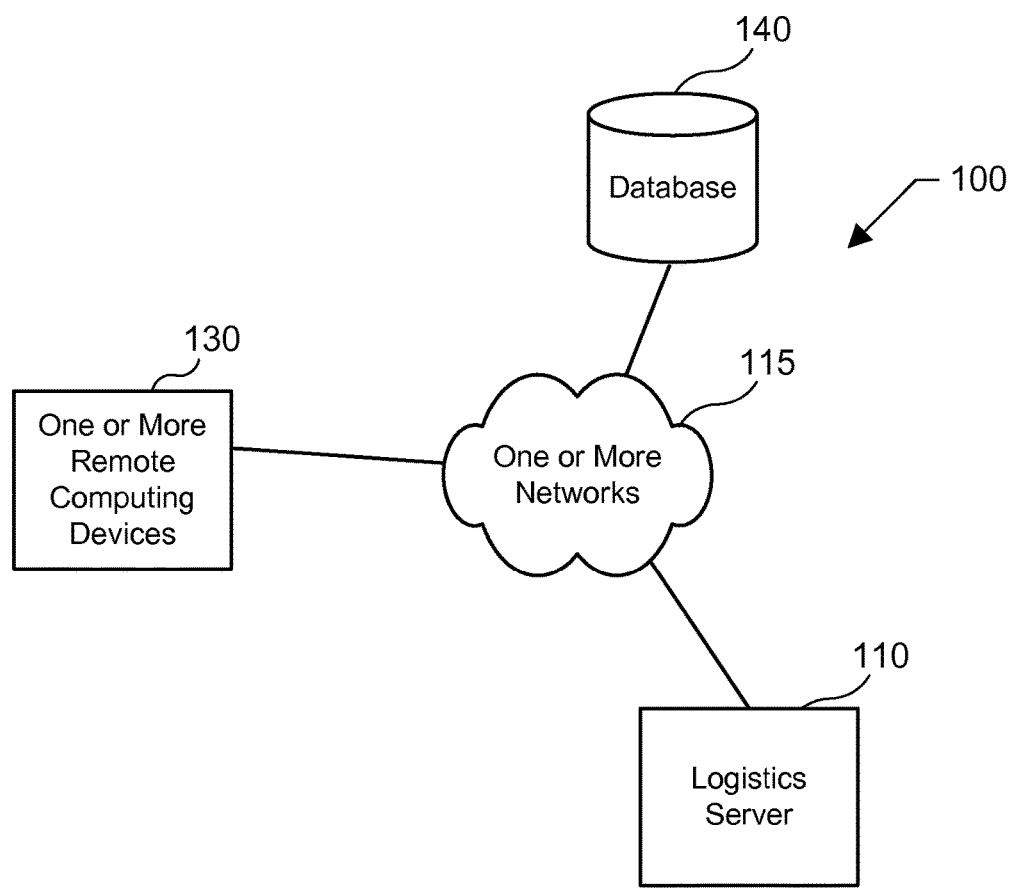
FIG. 1 is a block diagram of a return shipping system in accordance with an embodiment of the present system.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

In various embodiments, a system and method for facilitating shipping a parcel in the context of an item return is configured to enable the user to return the item without having to print or otherwise fill out a shipping label for shipping a parcel containing the item to be returned. This may be useful, for example, in situations where the user does not have access to a printer or a stock of pre-printed shipping labels or where an online retailer has not provided a return shipping label as part of a shipment containing an item purchased from the retailer.

In an exemplary implementation of systems and methods according to various embodiments, a user may bring a parcel containing an item for return to an access point as described above and either: (1) inform the attendant at the access point that the user wishes to return the item in the parcel to a particular retailer; or (2) indicate, at a computing device at the access point, the retailer to whom the user wishes to return the item (e.g., by using a graphical user interface to select the retailer from a list of retailers that accept such returns). The system may then optionally generate a barcode associated with the retailer. The attendant may then place the system-generated barcode, or a pre-printed barcode that is associated with the retailer, on the parcel. The attendant or the user then coordinates a pickup of the parcel by a common carrier at the access point or other suitable location. After the common carrier receives the parcel, the common carrier reads the barcode and uses information associated with the barcode to retrieve consignee information for the parcel. The consignee information may include, for example, a street address of an entity that will process the return of the item. The common carrier then facilitates delivery of the parcel to the entity that will process the return of the item.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of a Return Shipping System 100 according to a particular embodiment. As may be understood from this figure, the Return Shipping System 100 includes a Logistics Server 110, One or More Networks 115, One or More Remote Computing Devices 130 (e.g., such as a smart phone, a tablet computer, a wearable computing device, a laptop computer, a desktop computer, etc.), and a Database 140. In particular embodiments, the One or More Networks 115 facilitate communication between the One or More Remote Computing Devices 130 and the Logistics Server 110.

The One or More Networks 115 may include any of a variety of types of wired or wireless computer networks such as the Internet, a private intranet, a mesh network, a public switch telephone network (PSTN), or any other type of network (e.g., a network that uses Bluetooth or near field communications to facilitate communication between computing devices). The communication link between the One or More Remote Computing Devices 130 and the Logistics Server 110 may be, for example, implemented via a Local Area Network (LAN) or via the Internet.

Figure 2:
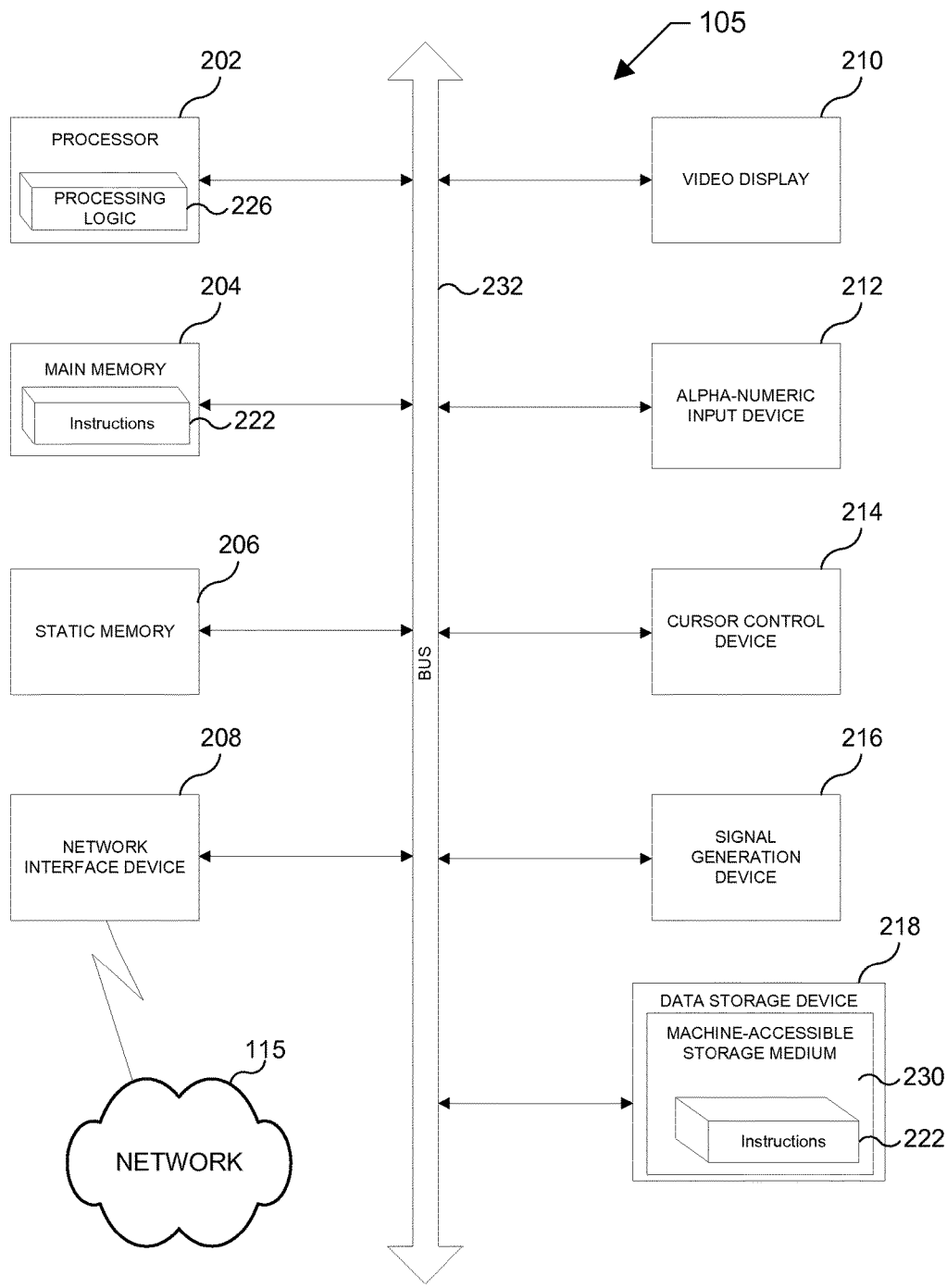
FIG. 2 is a schematic diagram of a computer, such as the logistics server of FIG. 1, that is suitable for use in various embodiments.

FIG. 2 illustrates a diagrammatic representation of a computer architecture 105 that can be used within the Return Shipping System 100, for example, as a client computer (e.g., one of the One or More Remote Computing Devices 110 shown in FIG. 1), or as a server computer (e.g., the Logistics Server 110 shown in FIG. 1). In particular embodiments, the computer 105 may be suitable for use as a computer within the context of the Return Shipping System 100 that is configured for facilitating a shipment of a parcel by a user substantially without requiring the user to place a shipping label on the parcel.

In particular embodiments, the computing device 105 may be connected (e.g., networked) to other computing devices in a LAN, an intranet, an extranet, and/or the Internet. As noted above, the computing device 105 may operate in the capacity of a server or a client computing device in a client-server network environment, or as a peer computing device in a peer-to-peer (or distributed) network environment. The computing device 105 may be a desktop personal computing device (PC), a tablet PC, a set-top box (STB), a Personal Digital Assistant (PDA), a cellular telephone, a web appliance, a server, a network router, a switch or bridge, or any other computing device capable of executing a set of instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein.

An exemplary computing device 105 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose or specific processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computing device 105 may further include a network interface device 208. The computing device 105 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computing device-accessible storage medium 230 (also known as a non-transitory computing device-readable storage medium or a non-transitory computing device-readable medium) on which is stored one or more sets of instructions (e.g., software 222) embodying any one or more of the methodologies or functions described herein. The software 222 may also reside, completely or at least partially, within the main memory 204 and/or within the processing device 202 during execution thereof by the computing device 120—the main memory 204 and the processing device 202 also constituting computing device-accessible storage media. The software 222 may further be transmitted or received over a network 115 via a network interface device 208.

While the computing device-accessible storage medium 230 is shown in an exemplary embodiment to be a single medium, the terms "computing device-accessible storage medium" and "computer-readable medium" should be understood to include a single medium or multiple media (e.g., a centralized or distributed database, and/or associated caches and servers) that store the one or more sets of instructions. The terms "computing device-accessible storage medium" and "computer-readable medium" should also be understood to include any that is capable of storing, encoding or carrying a set of instructions for execution by the computing device and that cause the computing device to perform any one or more of the methodologies of the present invention. The terms "computing device-accessible storage medium" and "computer-readable medium" should accordingly be understood to include, but not be limited to, solid-state memories, optical and magnetic media, etc.

Exemplary Access Points

Logistics networks, according to various embodiments, use access points (e.g., attended pickup/delivery locations) to facilitate: (1) the convenient delivery of parcels and other items to individuals; and/or (2) the convenient pickup of parcels and other items from individuals who wish to send those items to others via a common carrier. In various embodiments, a shipping access point may include, for example, a retail store (e.g., including a gas station, grocery store, or pharmacy), a stand-alone kiosk, or any other suitable location for receiving and processing parcels for shipment. For example, a gas station, a convenience store, a flower shop, a magazine stand, a retail location associated with a common carrier, a kiosk at a mall (or other type of shopping center), or a retail department store (e.g., or other brick-and-mortar store) may enter into an agreement with a common carrier to accept and process parcels for later pickup by the common carrier for further handling and/or ultimate shipment to a final destination.

In certain embodiments, each access point is manned for at least some time during the week and is equipped with a computer system that is adapted to communicate both with: (1) one or more computer systems associated with the common carrier; (2) one or more computing devices associated with the sender of the parcel; and (3) one or more computing devices associated with the recipient of the parcel. An example of a suitable computer system is shown in FIG. 1 and is described in greater technical detail below.

In particular embodiments, a computer at the access point (e.g., an "access point computer") is adapted to send suitable messages regarding the status of parcels handled by the access point. For example, when the access point receives a parcel, the access point computer may automatically transmit an e-mail, text, or other message to: (1) the common carrier's computer system; (2) the recipient's computing device; and/or (3) the sender's computing device indicating that the parcel has been received by the access point and is ready to be delivered to the recipient. The message may also include other suitable information, such as the name and location (e.g., address, GPS coordinates, etc.) of the access point and the days and hours of operation of the access point.

The access point may also automatically transmit an e-mail, text, or other message to: (1) the common carrier's computer system; (2) the recipient's computing device; (3) the sender's computing device; and/or (4) any other suitable computer in response to any suitable event including, for example: (1) the parcel being dropped off by the individual; (2) the parcel being sent to the recipient; (3) the parcel being transferred to another access point; or (4) any other suitable event.

In various embodiments, the system may be configured to facilitate the delivery of parcels directly to access points from, for example, e-commerce retailers from which users may order items for delivery. For example, the system may be configured to allow a user making purchases of items via the Internet to have those items delivered directly to the access points. In such embodiments, as well as in other embodiments, the system may be configured to present users with a selection of access points for items that the user orders. In other embodiments, the system may be configured to enable a user to have ordered items delivered to an access point by entering an address associated with the access point as the shipping address of the item.

In various embodiments, access points may be configured to enable users to drop off or deposit parcels for shipment. In particular embodiments, the system is configured to facilitate shipment of parcels from access point to any other location (e.g., business or residential addresses, other attended delivery/pickup locations, etc.). In some embodiments, access points are configured to hold parcels dropped off at the access point until a later time. In particular embodiments, access points may include secure compartments (e.g., lockers) for holding items for later pickup by a consignee or common carrier.

Exemplary System Platform

Various embodiments of a return shipping system are described below and may be implemented in any suitable context. For example, particular embodiments may be implemented within the context of a logistics service in order to provide users with simple methods for shipping parcels and, in particular, for returning items purchased from online retailers. Various aspects of the system's functionality may be executed by certain system modules, including an Item Return Shipping Module 300. This module is discussed more fully below. It should be understood that while the various steps of the Item Return Shipping Module 300 are described in a particular order, various embodiments of the Item Return Shipping Module 300 may perform the steps below in an order other than the order in which they are presented. Similarly, various embodiments may perform steps in addition to the steps described below or omit one or more of the described steps.

Item Return Shipping Module

Figure 3A:
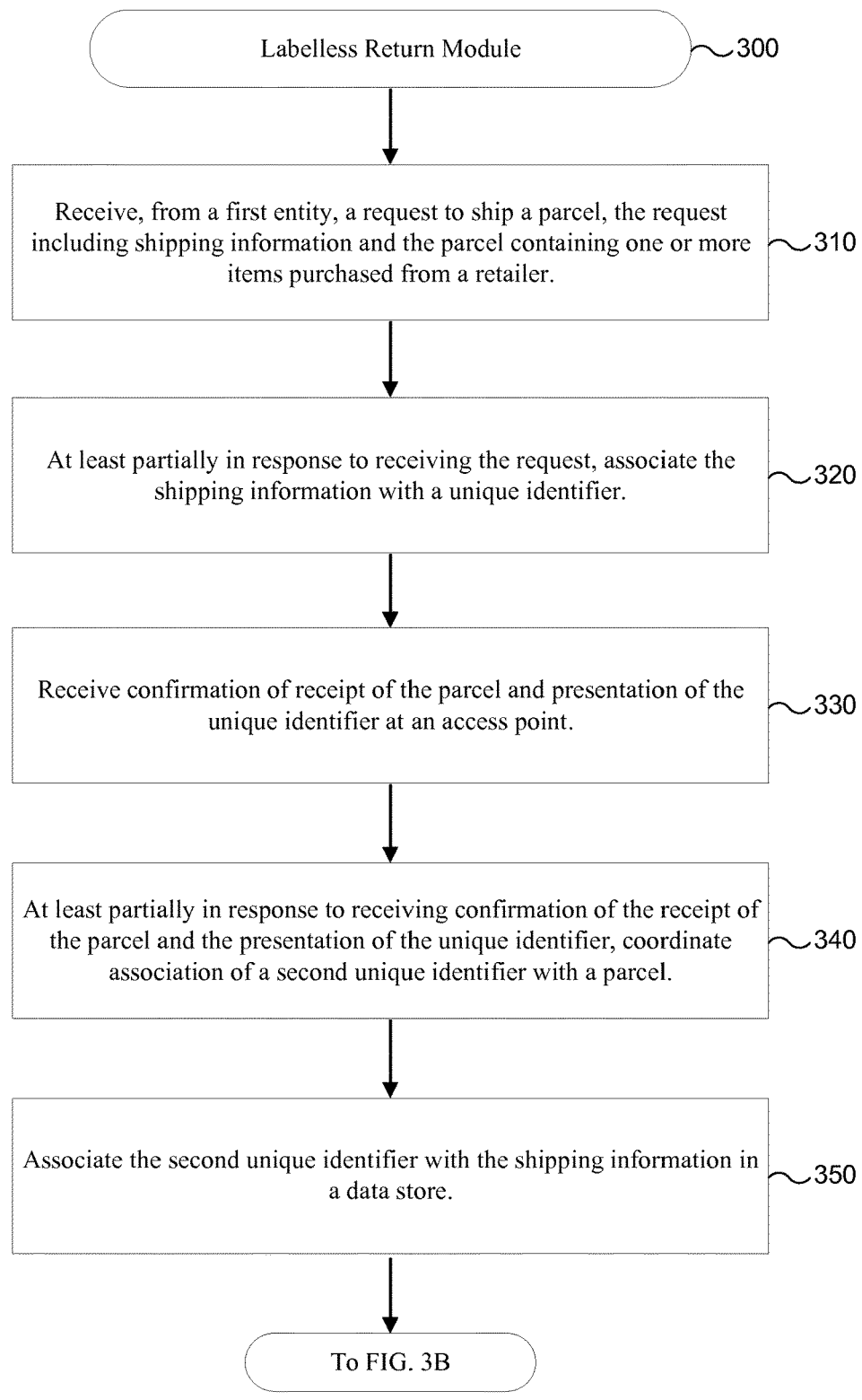
FIGS. 3A and 3B depicts a flow chart that generally illustrates various steps executed by an exemplary Item Return Shipping Module.
Figure 3B:
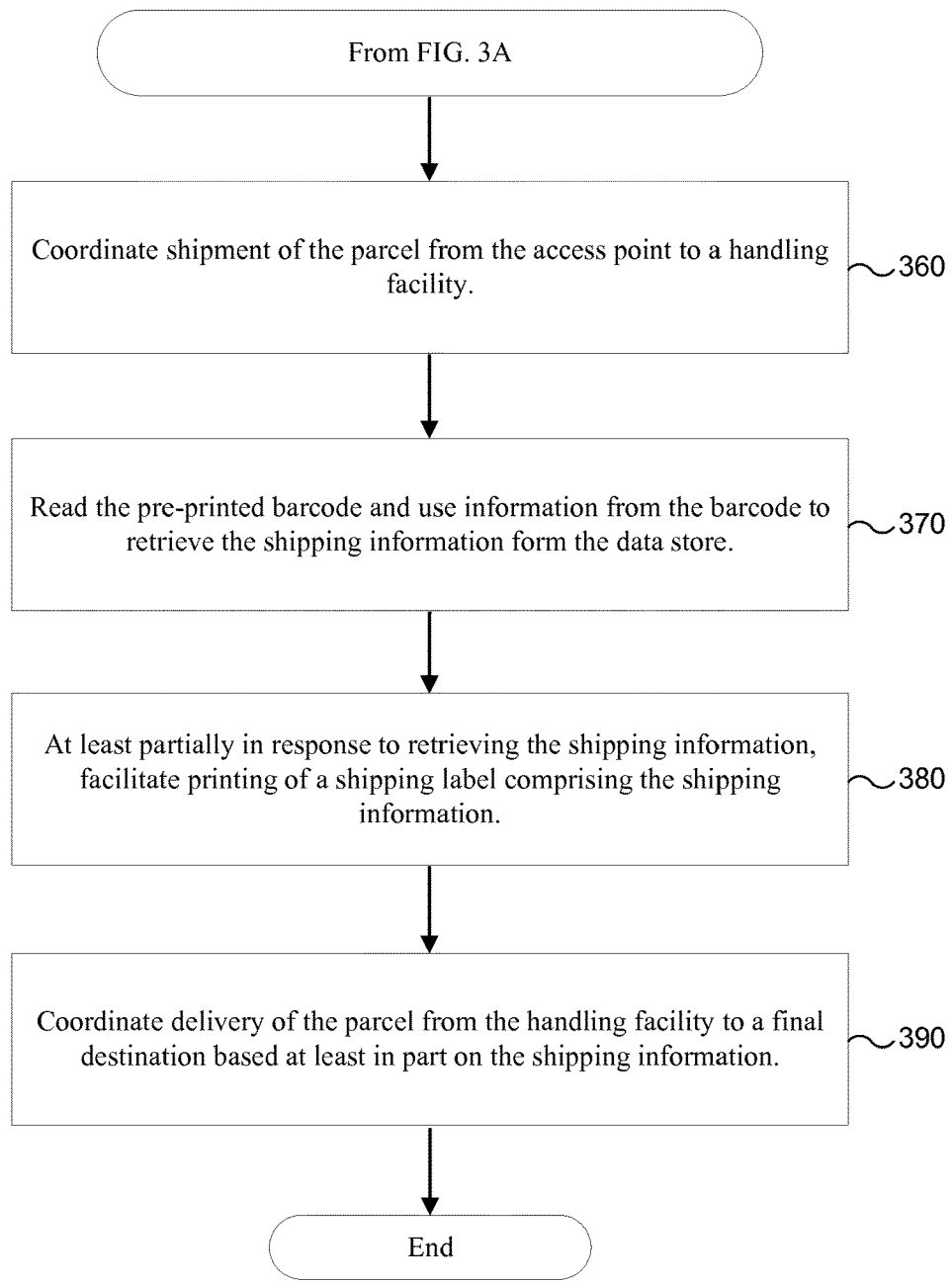

Turning to FIGS. 3A and 3B, when executing the Item Return Shipping Module 300, the system begins, in various embodiments, at Step 310 by receiving, from a first entity, a request to ship a parcel, where the request includes shipping information and the parcel contains one or more items purchased from a retailer. In particular embodiments, the request is a request to return the one or more items to the retailer and the shipping information includes the retailer's name and/or address. In particular embodiments, the shipping information may also include: (1) the name of the parcel's consignee; (2) a destination address for the parcel (e.g., a shipping address); (3) a return address for the parcel (e.g., the user's address); (4) a preferred shipping method for the parcel (e.g., ground shipping, next day shipping, 2-day shipping, or any other suitable shipping method); and/or (5) any other suitable information related to the shipment such as, for example, insurance information for the parcel, special handling instructions for the parcel, etc. In some embodiments, the shipping information includes retailer information. In other embodiments, when the user makes the request to ship the parcel, the user may provide payment (e.g., via credit card, money order, debit card, wire transfer, etc.) for the shipment of the parcel, a cost of which the system may, for example, determine based at least in part on the destination address and/or preferred shipping method. In other embodiments, the retailer may provide payment for the shipment of the parcel.

In various embodiments, the system is a carrier system (e.g., a system associated with a common carrier or other logistics services provider). In such embodiments, the carrier system may comprise a network of one or more access points for facilitating shipment of parcels. In various embodiments, each particular access point may comprise one or more computing devices which may, for example, be connected to the carrier system via a suitable network (e.g., via the Internet). In other embodiments, the system may include a retailer system associated with a particular retailer (e.g., the retailer from which the one or more items for return were purchased). In various embodiments, the system may include a carrier system and a retailer system which may, for example, be connected via one or more suitable network. In such embodiments, the carrier system may be configured to communicate with the retailer system (e.g., via the network) in order to send and receive data. In particular embodiments, a carrier system may be configured to receive a request to return one or more items directly from a user. In other embodiments, a carrier system may be configured to receive the request from a retailer (e.g., via the retailer system) on the user's behalf.

In various embodiments, the first entity is a user that desires to return the one or more items purchased from the retailer, which the user may, for example, have purchased themselves, received as a gift, or may be returning on behalf of another person. In the case of the first entity being a user wishing to return an item, the user may place the request from any suitable computing device, such as, for example, any suitable smart phone, tablet computer, desktop computer, or other suitable computing device. In various embodiments, the system receives the request from a computing device associated with the user. In other embodiments, the system receives the request from a computing device associated with an access point, such as any access point discussed below (e.g., such as a computing device located at the access point). In various embodiments, the user may log into an account associated with a common carrier via the computing device in order to make the request and enter retailer information associated with the one or more items, as well as (optionally) other shipping information associated with the retailer. In particular embodiments, the system is configured to provide the user with a selection of one or more retailers in response to the request to return the one or more items. In particular embodiments, the system is configured to provide the selection of one or more retailers by displaying the one or more retailers on a display associated with a computing device associated with the access point. In such embodiments, the system may, for example, cause the computing device associated with the access point to display the one or more retailers. In various embodiments, the one or more retailers may include one or more retailers that have provided return shipping information to the system (e.g., a return shipping address). In other embodiments, the carrier system may send a request for shipping information to a particular retailer system in response to selection, by the user, of a particular retailer from the list of one or more retailers.

In various embodiments, the system is configured to receive the request based on receiving shipping information associated with an original delivery of the one or more items the user desires to return. For example, in an embodiment in which the user has made a purchase from an online retailer, and received delivery of the item, the system may be configured to determine the retailer to whom the item should be returned based at least in part on shipping information associated with the delivery of the item to the user. For example, the system may determine a return address, retailer name, etc. based on a tracking or shipping number associated with an original delivery of the item to the user.

In other embodiments, the system may be configured to receive a selection of the retailer from the user and, based at least part on the selection of the retailer, retrieve (e.g., from a suitable database) shipping or other return information for the retailer (e.g., an address to which the retailer desires to have returned items sent, one or more of the retailer's return policies, or specific return information for the item being returned). In various embodiments, the shipping or other return information may be received by the system for one or more retailers. For example, a retailer that wishes to allow their customers to return items purchased from the retailer via an access point may provide the system (e.g., a carrier system) with the shipping and other return information associated with the retailer. In such embodiments, the system may be able to retrieve the return information associated with a particular retailer when a user is requesting to return an item to the particular retailer via an access point without further input from the particular retailer or requiring the access point or system facilitating the return to request further information from the particular retailer in order to facilitate the return.

In particular embodiments, the user is a user that may be unable or unwilling to print a shipping label (e.g., because they do not own a printer). In particular embodiments, the request may come from a user that is not currently present at a location that is capable of accepting one or more parcels for shipment (e.g., the user may be at their home, office, or other location). In other embodiments, the system may receive the request from a user that is currently at a shipping access point (e.g., such as any suitable access point discussed herein, kiosk, drop box) or other location where the user may drop off one or more parcels for shipment.

In various embodiments, the system is further configured to enable the retailer to approve or deny the request to return the item before the item is shipped. For example, a retailer may deny the return if the user is attempting to return an un-returnable item (e.g., an item for which the return period has expired, a final sale item, etc.) or for any other suitable reason. In various embodiments, the system is configured to enable the retailer to authorize payment for the item return (e.g., so the user does not have to pay for return shipping of the one or more items). In various embodiments, the system is configured to request authorization for the return from the particular retailer. For example, in embodiments in which the user requests to make the return via a carrier system at an access point, the carrier system may, in response to the request to return the item, request authorization from the retailer to facilitate return of the item by: (1) transmitting a request to the retailer system for authorization via a network; and (2) receiving authorization from the retailer system via the network. In particular embodiments, the request for authorization may include information associated with the one or more items for return such as, for example, an order number, item name, item description, invoice number associated with the purchase of the item, etc. In various other embodiments, such as embodiments in which a user initiates a return of an item via a retailer system, the system may be configured to approve or deny a return request in response to receiving the request.

In still other embodiments, the system is configured to notify a retailer (e.g., by communicating over a network with a retailer system or server) of the user's request to return an item. In various embodiments, the system is configured to transmit, via a network, order information associated with the one or more items that the user is attempting to return to the retailer. In particular embodiments, the system is configured to receive this order information as part of the request to facilitate the return of the one or more items.

In other embodiments, the first entity is a retailer who may desire to facilitate the return of one or more items on behalf of a user. For example, a user that has purchased one or more items from a retailer (e.g., such as an online retailer or other retailer) may contact the retailer and express a desire to return one or more of the one or more items. The retailer may then initiate the return by requesting shipment of the item on behalf of the user. In such embodiments, the retailer may, for example, contact the carrier system via a network (e.g., the retailer system may contact the carrier system via the network). The retailer system may then transmit data over the network to the carrier system for facilitation of shipment of the one or more return items such as, for example, a destination address, etc.

In various embodiments, the system is configured to enable a user to make a request to facilitate a return of one or more items in a parcel without requiring the user to print any sort of label or shipping information associated with the return. In particular, the system may enable a user that does not own a printer to: (1) manifest a return shipment; and (2) drop off a parcel containing one or more items to return to a particular retailer, without having to print a shipping or other label.

The system continues, at Step 320 by, at least partially in response to receiving the request, associating the shipping information with a first unique identifier in the system's memory or in any other suitable memory. In particular embodiments, the first unique identifier includes any suitable alphanumeric code, such as a unique alphanumeric code that may, for example, be any machine-readable indicia such as a barcode (e.g., a linear barcode, a matrix barcode, a QR Code, etc.), RFID tag, unique identifier, or other electronic tag identification. In other embodiments, the first unique identifier may include any suitable unique identifier that may be presented by the user at an access point when dropping off the parcel for shipment (such as a confirmation code, etc.). In particular embodiments, the system is configured to provide the first unique identifier to the user, for example, by sending the first unique identifier to the user (e.g., via a suitable electronic transmission to the user, such as email, SMS, etc.) or by displaying the first unique identifier on a computing device associated with the user (e.g., on the user's smart phone). In various embodiments, the system providing the first unique identifier may include a carrier system or retailer system.

In particular embodiments, the system is configured to generate the first unique identifier in response to receiving the request at Step 310. For example, a carrier system may generate the unique identifier in response to receiving a request to facilitate the return of an item from a user via a handheld computing device associated with the user. In other embodiments, the unique identifier may include a pre-existing unique identifier. In a particular embodiments, the pre-existing unique identifier is a unique identifier that was provided to the user by the retailer. For example, when the customer ordered the one or more items from the retailer, the retailer may have included a unique 'return' identifier in any suitable manner (e.g., by including the unique identifier in a parcel when retailer shipped the one or more items to the customer, in an e-mail or other message, etc.). In particular embodiments, a carrier system may be configured to query a retailer system for shipping information related to the unique 'return' identifier in response to receiving a request to facilitate a return of one or more items. In such embodiments, the carrier system may then store the shipping information and memory and associate the shipping information with the unique 'return' identifier.

In various embodiments, the system is configured to facilitate a confirmation of the contents of the parcel containing the one or more items. The system may, for example, receive confirmation (e.g., from a computer associated with the access point) that the one or more items to be returned to the retailer are, in fact, contained in the parcel prior to coordinating delivery of the parcel to the handling facility from the access point. In particular embodiments, an attendant at the access point may manually confirm this and enter the confirmation into an access point computer when the attendant receives the parcel from the user. The confirmation may be a simple message indicating particular contents are present. In further embodiments, the message may include the serial number of the items being returned, a picture of the items, a return authorization number, or other identifying information.

In various embodiments, when the first entity is the retailer, the system is configured to provide the first unique identifier to the user (e.g., a customer of the retailer). In other embodiments, the system is configured to provide the first unique identifier to the retailer (e.g., the retailer system), so that the retailer can provide it to a customer attempting to return the one or more items. In various embodiments, the first unique identifier may include an identifier that the common carrier has utilized previously in association with a different shipment. For example, the common carrier may recycle (e.g., re-use) identifiers that have been previously associated with other shipping information at a later time. The time may be any time such as any suitable length of time after the particular identifier has been utilized by a user to initiate a shipment at an access point as discussed herein.

Continuing at Step 330, the system receives confirmation of receipt of the parcel and presentation of the first unique identifier at a shipping access point. In various embodiments, a shipping access point may include, for example, a retail store (e.g., including a gas station, grocery store, or pharmacy), a stand-alone kiosk, or any other suitable location for receiving and processing parcels for shipment. For example, a gas station, a convenience store, a flower shop, a magazine stand, a retail location associated with a common carrier, a kiosk at a mall (or other type of shopping center), or a retail department store (e.g., or other brick-and-mortar store) may enter into an agreement with a common carrier to accept and process parcels for later pickup by the common carrier for further handling and/or ultimate shipment to a final destination.

In certain embodiments, the access point is manned for at least some time during weekdays and/or weekends and is equipped with a computer system that is adapted to communicate with: (1) one or more computer systems associated with the common carrier; (2) one or more computing devices associated with the sender of the parcel (e.g., the user); (3) one or more computing devices or computing systems associated with one or more retailers; (4) etc. In particular embodiments, the communication may occur via any suitable network such as, for example, the Internet. In various other embodiments, the access point is unmanned and equipped with a computer system configured to enable the user to implement various functions described herein substantially without the help of a human attendant.

In particular embodiments, the system receives confirmation of receipt of the parcel and presentation of the first unique identifier at the access point in response to entry (e.g., by the user or an attendant at the access point) of the first unique identifier into a computing device associated with (e.g., located at) the access point. For example, the user or an attendant may: (1) enter the first unique identifier into the access point's computer system using a suitable alpha-numeric entry device (e.g., keyboard); (2) provide the first unique identifier in a way that the system may interpret using suitable voice recognition techniques (e.g., by speaking the first unique identifier into one or more microphones associated with the system; (3) scan the first unique identifier (e.g., using a suitable barcode scanner, imaging device, or other suitable scanning device); and/or (4) use any other suitable method of providing the first unique identifier at the access point.

Next, at Step 340, at least partially in response to receiving the confirmation at Step 330, the system coordinates placement of a second unique identifier on the parcel. In various embodiments the second unique identifier comprises a pre-existing unique identifier such as, for example, a pre-printed barcode, RFID tag, electronic tag, flexible or rigid container with a unique identifier, etc.) This may be coordinate association of the second unique identifier with the parcel by, for example, displaying instructions on a display screen indicating that a human user should place a pre-printed label that includes the second unique identifier on the parcel, by printing the second unique identifier onto a label that is to be placed on the parcel, by generating the second unique identifier, or through any other suitable technique of coordinating placement of the second unique identifier on the parcel. Although the second unique identifier may be unique to the particular transaction (e.g., the return transaction), it may have been previously used by the system in a prior shipping transaction and re-used as discussed above.

In various embodiments, one or more labels may be provided (e.g., in rolls or sheets of stickers including a pre-printed barcode, RFID tags, electronic tags, flexible or rigid containers with unique identifiers, etc.) at the access point that may be placed on the parcel. The containers may be cardboard boxes, plastic boxes, bags or the like. In other embodiments, the system is configured to print (e.g., generate and print) a barcode, encode an electronic tag, etc. at the access point for placement on the parcel. This system may execute this step, for example, in response to receiving the confirmation at Step 330.

In particular embodiments, the system is configured to facilitate placement of any other suitable machine-readable indicia on the parcel (e.g., a machine-readable indicia other than a barcode) that includes (e.g., communicates) the second unique identifier. In particular embodiments, the system is configured to facilitate placement of the other suitable machine-readable indicia on the parcel (e.g., a unique identifier comprising one or more characters, one or more images, etc.) that are representative of the second unique identifier. In such embodiments, the system may be configured to read the unique identifier using suitable optical character recognition (OCR) techniques, image recognition techniques, etc. Other machine readable indicia may include, for example, electronic tags that can be programmed to broadcast a unique code (e.g., RFID tags).

As noted above, in particular embodiments, the system may be configured to facilitate placement of a barcode (e.g., or other unique identifier such as an electronic tag, RFID tag, etc.) by instructing (e.g., displaying instructions to) an access point attendant or the user to place the pre-printed barcode on the parcel. In other embodiments, the system may be configured to print a barcode or other indicia directly on the parcel, or otherwise substantially automatically place the barcode on the parcel (e.g., using a stamp or other suitable mechanism).

In various embodiments, the pre-printed barcode or other unique identifier may include space (e.g., blank space) where shipping information (e.g., such as a delivery address) for the parcel may later be provided (e.g., written or printed). In particular embodiments, the space may be selected and sized to enable the system to print the shipping information directly within the space. In other embodiments, the space may be sized to enable the system to affix shipping information substantially within the available space.

Returning to FIGS. 3A and 3B, the system next proceeds to Step 350, where it associates the second unique identifier with the shipping information in a data store (e.g., such as the Database 140). In particular embodiments, the system is configured to also associate the second unique identifier with additional information such as, for example, the parcel's weight, dimensions, etc. In various embodiments, the system is configured to receive information associated with the parcel (e.g., such as size, weight, etc.) from the access point. The access point may, for example, have one or more computer peripherals (e.g., scales, cameras, or other devices), or non-peripheral devices, that may be used to weigh and/or measure the parcel in order to enable the user (e.g., or another individual) to provide such information to the system. In other embodiments, the system may determine the dimensions of the parcel from one or more images that the system takes of the parcel.

In particular embodiments, the data store may include any suitable data store such as any of one or more suitable servers or other computer storage media suitable for the storage of and later retrieval of the information by the system. In particular embodiments, the data store may be located on one or more local or remote servers.

Next, at Step 360, the system coordinates shipment of the parcel from the access point to a parcel handling facility by, for example, transmitting an electronic or non-electronic message to a suitable common carrier or other logistics provider indicating that the parcel is available for pickup. In particular embodiments, the system is configured to facilitate the delivery via a particular common carrier, such as a common carrier to which the user made the request to ship the parcel. In various embodiments, the system is configured to execute a pickup of the parcel from the access point at least partially in response to receiving the confirmation at Step 330 for delivery to the handling facility. In particular embodiments, the system is configured to receive confirmation of delivery of the parcel to the handling facility. In various embodiments, the system is configured to receive confirmation of the delivery of the parcel to the handling facility by receiving a scan of the second unique identifier at the handling facility. In other embodiments, the system is configured to provide tracking information associated with the parcel (e.g., a current location of the parcel) to: (1) the user; (2) an intended parcel recipient; and/or (3) any other suitable individual or entity.

At the parcel handling facility (e.g., a parcel handling facility, or a shipping hub, associated with the common carrier handling the parcel), the system, at Step 370, receives the second unique identifier from the parcel (e.g., by using any suitable technique to read a pre-printed barcode or alphanumeric string that represents the second unique identifier from the surface of the parcel). The system then uses the second unique identifier to retrieve the shipping information from the data store. In various embodiments, the system is configured to read the second unique identifier using any suitable scanner, imaging device, interrogator, etc.

Continuing at Step 380, the system, at least partially in response to retrieving the shipping information, facilitates printing of a shipping label (e.g., comprising the shipping information) for placement on the parcel. In particular embodiments, the shipping label comprises the name of the handling facility and/or the retailer. In various embodiments, the shipping label comprises a shipping address for the parcel and/or other information related to the shipment of the parcel. In some embodiments, the shipping label may include return confirmation information such as a return merchandize authorization number, order number, or other suitable return confirmation information. In certain embodiments, the shipping label may include information concerning the contents of the parcel. In particular embodiments, the system facilitates printing of the shipping label on an adhesive-backed paper, which may, for example, be placed substantially automatically on the parcel or placed on the parcel by an employee or other individual at the handling facility.

In other embodiments, the system may utilize one or more other suitable techniques for directing a parcel to its ultimate destination (e.g., one or more techniques other than a shipping label). In various embodiments, the one or more other techniques may include, for example, placing the parcel in a secondary container, bag, or other parcel that contains one or more shipping indicators such as, for example, an existing shipping label, an RFID tag or other electronic tag, a machine-readable-indicia, etc.

In various embodiments, the system is configured to print shipping information substantially directly on the parcel (e.g., on an outer surface of the parcel, in the space on a pre-printed label affixed to the parcel discussed above, etc.). In other embodiments, the system is configured to facilitate attachment or application of the shipping information to the parcel in any suitable manner other than those described above.

The system then, at Step 390, coordinates delivery of the parcel from the handling facility to the parcel's final destination based at least in part on the shipping information. In various embodiments, the system is configured to facilitate delivery in a way that at least satisfies a shipping speed (e.g., overnight, second day, etc.) that is included in the shipping information received at Step 310. In other embodiments, the system is configured to facilitate delivery of the parcel in a manner that conforms to any special handling instructions (e.g., handle with care, signature required, cool storage required, etc.), which may, for example, have been provided within the shipping information.

Illustrative Example

As an illustrative example, a user may initiate shipment of a parcel by using a software application running on a suitable computing device (e.g., their computer, smartphone, etc.) in order to initiate a return of an item purchased at an online retail store. During this process, the user may select the online retailer from a selection of online retailers provided in response to the initiation of the return by the user (e.g., a selection of online retailers that have a partnership with, or have provided return information to, the common carrier such as an address to return items to and other shipping information, etc.). The system may then generate a first unique identifier in the form of a barcode, associate the first unique identifier with shipping information for the retailer (or other suitable item return processing facility) that is, for example, stored in the system's memory or provided by the user, and send the unique identifier to a mobile computing device associated with the user (e.g., the user's smartphone). The user may then take the parcel to an access point (such as a gas station that has contracted with a common carrier to serve as an access point for the common carrier), give the parcel to an access point representative, and present the unique identifier to the access point representative.

In various embodiments, enabling the user to initiate the return via a computing device and enabling the user to product the unique identifier by showing the unique identifier to a representative on their mobile computing device may solve the technical problem of enabling a user to return a purchased item without having to print any sort of shipping label or receipt. This may be especially useful, for example, if the user does not have access to a printer (e.g., because they do not own one). The access point representative may then use a barcode scanner associated with the system to first scan the unique identifier and then scan a label that includes a pre-printed barcode (or other pre-printed machine-readable indicia) that represents a second unique identifier. The system then uses the first and second unique identifiers to associate, within the system's memory, the second unique identifier with the shipping information and/or the first unique identifier. The attendant then places the label containing the pre-printed barcode on the parcel and places the parcel in a bin or other storage container for later pickup by a common carrier (which may pick items up from the access point according to a particular schedule).

Once picked up by the common carrier from the access point, the parcel is taken by the common carrier to a parcel handling facility where the pre-printed barcode is scanned by the system using a barcode scanner, or imaging device associated with the system, to determine the second unique identifier. The system then uses the second unique identifier to obtain the shipping information for the parcel (e.g., from a database associated with the system). The system, in this particular example, then generates and prints a shipping label for the parcel. In various embodiments, the shipping label includes the shipping information for the parcel (e.g., the destination address) that the user originally entered for the parcel. The system then facilitates shipment of the parcel to the destination address (e.g., the address associated with the retailer or a third party entity that the retailer has retained to process returns on behalf of the retailer).

Although the above example is described using a pre-printed barcode as a unique identifier, it should be understood that various embodiments of the system may use other suitable unique identifiers such as any suitable identifier discussed above. Similarly, although this example describes the placement of a printed shipping label, other various embodiments of the system may utilize other suitable techniques for directing a parcel to its ultimate destination.

Figure 4:
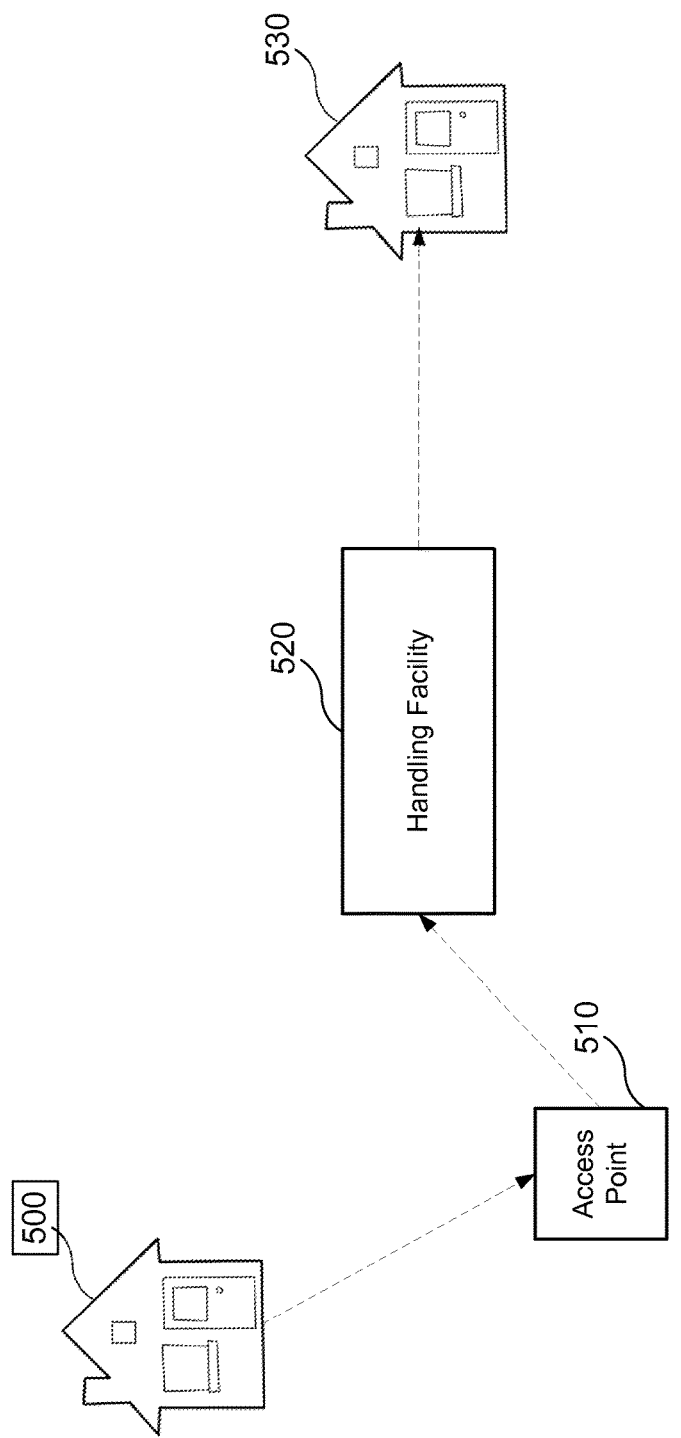
FIG. 4 depicts a transportation diagram depicting an exemplary transportation path that may be taken by a parcel shipped using the return shipping system.

FIG. 4 depicts a transportation diagram depicting an exemplary transportation path that may be taken by a parcel shipped via the above-described process. As may be understood from this figure, a user may place an item for shipping into a parcel at their home 400. The user may then access their account with a common carrier via a desktop computer in their home in order to provide shipping information and receive a generated unique identifier. The user may then take the parcel to an access point 410 (e.g., by driving, walking, etc.). After presenting the unique identifier at the access point and after a pre-printed barcode is placed on the parcel, a common carrier transports the parcel to a local distribution center 420 (e.g., a handling facility). At the local distribution center, the barcode is scanned to retrieve shipping information for the parcel, and a shipping label is printed and placed on the parcel. The system then facilitates shipment of the parcel to its final destination 430.

Conclusion

Many modifications and other embodiments of the invention will come to mind to one skilled in the art to which this invention pertains having the benefit of the teachings presented in the foregoing descriptions and the associated drawings. While examples discussed above cover the use of the invention in the context of a return shipping service, the invention may be used in any other suitable context. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer-implemented method of enabling a user to return an item to a retailer via an access point, the method comprising:
   receiving, by one or more processors, from a first entity, a request to ship a parcel, the request including shipping information associated with a retailer from which the item was purchased;
   at least partially in response to receiving the request, generating, by a processor, a unique identifier and associating, by the one or more processors, the shipping information with the unique identifier;
   receiving, by the one or more processors, confirmation of (a) receipt of the parcel and (b) presentation of the unique identifier at an access point;
   at least partially in response to receiving confirmation of the receipt of the parcel and the presentation of the unique identifier, facilitating, by the one or more processors, associating a second unique identifier with the parcel;

associating, by the one or more processors, the second unique identifier with the shipping information in a data store;

facilitating, by the one or more processors, shipment of the parcel from the access point to a handling facility;

reading, by the one or more processors, the second unique identifier and using, by the one or more processors, information from the second unique identifier to retrieve the shipping information from the data store;

at least partially in response to retrieving the shipping information, facilitating, by the one or more processors, placement of a shipping label on the parcel at the handling facility; and facilitating, by the one or more processors, delivery of the parcel from the handling facility to the retailer based at least in part on the shipping information.

2. The computer-implemented method of claim 1, wherein:
the first entity is a representative associated with the retailer; and
the computer-implemented method further comprises providing, by the one or more processors, the unique identifier to the user desiring to return the item by:
transmitting the unique identifier to a computing device associated with the user via one or more networks.

3. The computer-implemented method of claim 2, wherein receiving confirmation of presentation of the unique identifier at the access point comprises receiving, by a computing device associated with the access point, input of the unique identifier.

4. The computer-implemented method of claim 3, wherein the unique identifier is a unique identifier selected from a group consisting of:
a machine-readable indicia; and
an electronic tag.

5. The computer-implemented method of claim 1, wherein the first entity is the user desiring to return the item.

6. The computer-implemented method of claim 5, wherein the method further comprises providing, by the one or more processors, a selection of one or more retailers from which the user may select the retailer when making the request.

7. The computer implemented method of claim 6, further comprising notifying the retailer, by the one or more processors, of the request.

8. The computer-implemented method of claim 7, further comprising enabling, by the one or more processors, the retailer to approve or deny the request.

9. The computer-implemented method of claim 1, wherein the unique identifier comprises a pre-printed barcode.

10. A non-transitory computer-readable medium storing computer-executable instructions for:
receiving, from a user, a request to return an item purchased from a particular retailer, wherein the request includes shipping information;
at least partially in response to receiving the request, providing the user a selection of one or more retailers from which to select the particular retailer;
at least partially in response to receiving the selected particular retailer from the user:
generating a unique identifier;
associating the unique identifier with the particular retailer; and
providing the unique identifier to the user;
receiving an indication at an access point that the user has presented:
a parcel containing the item; and
the unique identifier;
at least partially in response to receiving the indication:
associating a pre-printed barcode with the particular retailer and the request; and
facilitating placement of the pre-printed barcode on the parcel at the access point;
facilitating delivery of the parcel from the access point to a shipping hub;
receiving confirmation of delivery of the parcel at the shipping hub, wherein the confirmation is based at least partially on reading the pre-printed barcode;
at least partially in response to receiving confirmation of the delivery, facilitating placement of a shipping label on the parcel, the shipping label containing the shipping information, which is associated with the particular retailer; and
facilitating shipment of the parcel from the shipping hub to a final destination, the final destination being based at least in part on the shipping information associated with the particular retailer.

11. The non-transitory computer-readable medium of claim 10, further storing computer executable instructions for, at least partially in response to receiving the selected particular retailer from the user, enabling the particular retailer to approve or deny the request.

12. The non-transitory computer-readable medium of claim 11, further storing computer executable instructions for, at least partially in response to receiving approval for the request from the particular retailer, enabling the particular retailer to authorize payment for the shipment by the particular retailer.

13. The non-transitory computer-readable medium of claim 10, wherein receiving the request from the user comprises receiving the request from a computing device associated with the user.

14. The non-transitory computer-readable medium of claim 10, wherein receiving the request from the user comprises receiving the request from a computing device associated with the access point.

15. A computer system comprising:
at least one processor, wherein the computer system is configured for:
receiving a request including shipping information from a retailer to ship a parcel, the parcel containing one or more items purchased from the retailer by a customer;
at least partially in response to receiving the request:
associating the request with a unique identifier; and
providing the unique identifier to the customer;
receiving the unique identifier at an access point;
at least partially in response to receiving the unique identifier at the access point:
facilitating placement of a barcode on the parcel; and
associating the barcode with the unique identifier;
facilitating delivery of the parcel from the access point to a shipping hub;
receiving confirmation of the delivery of the parcel to the shipping hub, wherein the confirmation is based at least partially on reading the barcode;
at least partially in response to receiving confirmation of the delivery, facilitating placement of the shipping information associated with the retailer on the parcel; and facilitating delivery of the parcel to a final destination, where the final destination is based at least in part on the shipping information associated with the retailer.

16. The computer system of claim 15, wherein the computer system is further configured for facilitating confirmation that the parcel contains the one or more items before facilitating delivery of the parcel from the access point to the shipping hub.

17. The computer system of claim 16, wherein the computer system is further configured for notifying the retailer of the confirmation that the parcel contains the one or more items.

18. The computer system of claim 15, wherein the computer system is further configured for generating the unique identifier at least partially in response to the request.

19. The computer system of claim 15, wherein the unique identifier comprises a barcode.

* * * * *

UNITED STATES PATENT AND TRADEMARK OFFICE
CERTIFICATE OF CORRECTION

PATENT NO. : 10,410,165 B2
APPLICATION NO. : 14/942697
DATED : September 10, 2019
INVENTOR(S) : Andy Tibbs et al.

It is certified that error appears in the above-identified patent and that said Letters Patent is hereby corrected as shown below:

On the Title Page

Item (56), page 6 Column 1 (Other Publications); Line 42: Please remove "_contenl." and replace with -- _content. --.

Item (56), page 6 Column 1 (Other Publications); Line 49: Please remove "ofThe" and replace with -- of The --.

Item (56), page 6 Column 1 (Other Publications); Line 51: Please remove ":http:I/" and replace with -- :http:// --.

Item (56), page 6 Column 1 (Other Publications); Line 51: Please remove "1 06." and replace with -- 106. --.

Item (56), page 6 Column 1 (Other Publications); Line 58: Please remove "/printth is/200 1/" and replace with -- /printthis/2001/ --.

Item (56), page 6 Column 1 (Other Publications); Line 58: Please remove ", DO .him l," and replace with -- ,DO.html, --.

Item (56), page 6 Column 2 (Other Publications); Line 06: Please remove "<U RL:" and replace with -- <URL: --.

Item (56), page 6 Column 2 (Other Publications); Line 6-7: Please remove "www. transportando. nel/newsabri 1_ completa .him>." and replace with -- www.transportando.nel/newsabri1_complete.html>. --.

Item (56), page 6 Column 2 (Other Publications); Line 9: Please remove "/aboul/" and replace with -- /about/ --.

Signed and Sealed this
Fifth Day of November, 2019

Andrei Iancu
*Director of the United States Patent and Trademark Office*

CERTIFICATE OF CORRECTION (continued)
U.S. Pat. No. 10,410,165 B2

Item (56), page 6 Column 2 (Other Publications); Line 10: Please remove "/aboul/" and replace with -- /about/ --.

Item (56), page 6 Column 2 (Other Publications); Line 10: Please remove ".hlml?" and replace with -- .html? --.

Item (56), page 6 Column 2 (Other Publications); Line 12: Please remove "<hllp:l/" and replace with -- <http:// --.

Item (56), page 6 Column 2 (Other Publications); Line 13: Please remove ".hlml," and replace with -- .html, --.

Item (56), page 6 Column 2 (Other Publications); Line 14: Please remove ".hlml," and replace with -- .html, --.

In the Claims

Column 17, Line 45: Please remove "computer implemented" and replace with -- computer-implemented --.